(12) United States Patent
Kim et al.

(10) Patent No.: US 11,818,794 B2
(45) Date of Patent: Nov. 14, 2023

(54) METHOD AND APPARATUS FOR REPORTING LOGGING INFORMATION IN WIRELESS COMMUNICATION SYSTEM

(71) Applicant: LG Electronics Inc., Seoul (KR)

(72) Inventors: Hongsuk Kim, Seoul (KR); Sunghoon Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 153 days.

(21) Appl. No.: 17/542,091

(22) Filed: Dec. 3, 2021

(65) Prior Publication Data

US 2022/0182810 A1  Jun. 9, 2022

(30) Foreign Application Priority Data

Dec. 3, 2020 (KR) .................. 10-2020-0167640

(51) Int. Cl.
*H04W 8/12* (2009.01)
*H04W 8/18* (2009.01)
*H04W 36/32* (2009.01)
*H04W 60/04* (2009.01)
*H04W 76/30* (2018.01)
*H04W 68/00* (2009.01)
*H04W 48/20* (2009.01)
*H04W 76/20* (2018.01)

(52) U.S. Cl.
CPC ............ *H04W 8/12* (2013.01); *H04W 8/183* (2013.01); *H04W 36/32* (2013.01); *H04W 48/20* (2013.01); *H04W 60/04* (2013.01); *H04W 68/005* (2013.01); *H04W 76/20* (2018.02); *H04W 76/30* (2018.02)

(58) Field of Classification Search
CPC ....... H04W 8/12; H04W 8/183; H04W 36/32; H04W 48/20; H04W 60/04; H04W 68/005; H04W 76/20; H04W 76/30; H04W 24/10; H04W 48/18; H04W 60/005
See application file for complete search history.

(56) References Cited

U.S. PATENT DOCUMENTS

2013/0203420 A1* 8/2013 Hapsari ................. H04W 24/10
                                                       455/437
2015/0223094 A1* 8/2015 Tomala ................. H04W 24/10
                                                      455/67.11

FOREIGN PATENT DOCUMENTS

EP           2508022 A1 * 10/2012 ............ H04W 24/08

OTHER PUBLICATIONS

3GPP, "3rd Generation Partnership Project; Technical Specification Group Services and System Aspects; Study on system enablers for devices having multiple Universal Subscriber Identity Modules (USIM) (Release 17)," TR 23.761 V1.2.0, Nov. 2020, 108 pages.
3GPP, "3rd Generation Partnership Project; Technical Specification Group Radio Access Network; NR; User Equipment (UE) procedures in Idle mode and RRC Inactive state (Release 16)," TS 38.304 V16.2.0, Sep. 2020, 39 pages.

(Continued)

*Primary Examiner* — Ashley Shivers
(74) *Attorney, Agent, or Firm* — Fish & Richardson P.C.

(57) ABSTRACT

The present disclosure relates to reporting logging information in wireless communications. According to an embodiment of the present disclosure, the wireless device may report information informing that an out-of-coverage is detected upon a subscriber identity module (SIM) switching, to a network.

16 Claims, 18 Drawing Sheets

(56) References Cited

OTHER PUBLICATIONS

3GPP, "3rd Generation Partnership Project; Technical Specification Group Radio Access Network; NR; Radio Resource Control (RRC) protocol specification (Release 16)," TS 38.331 V16.2.0, Sep. 2020, 921 pages.
Vivo et al., "New WID: Support for Multi-SIM devices in Rel-17," RP-193263 (revision of RP-193250), Presented at 3GPP TSG RAN Meeting #86, Sitges, Spain, Dec. 9-12, 2019, 5 pages.

* cited by examiner

METHOD AND APPARATUS FOR REPORTING LOGGING INFORMATION IN WIRELESS COMMUNICATION SYSTEM

CROSS-REFERENCE TO RELATED APPLICATION

Pursuant to 35 U.S.C. § 119 (a), this application claims the benefit of Korean Patent Application No. 10-2020-0167640 filed on Dec. 3, 2020, the contents of which are all hereby incorporated by reference herein in their entirety.

BACKGROUND OF THE DISCLOSURE

Field of the Disclosure

The present disclosure relates to reporting logging information in wireless communications.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

In wireless communications, there may be a need to perform a driving test to measure a network coverage for coverage optimization. The minimization of driving test (MDT) may refer to a test by operators for measuring the network coverage using a UE instead of a vehicle. For the MDT, the UE may generate logging information and report the logging information to a network.

SUMMARY OF THE DISCLOSURE

Technical Problem

An aspect of the present disclosure is to provide method and apparatus for reporting logging information in a wireless communication system.

Another aspect of the present disclosure is to provide method and apparatus for generating logging information in a wireless communication system.

Yet another aspect of the present disclosure is to provide method and apparatus for generating and reporting logging information in a MUSIM operation in a wireless communication system.

Technical Solution

According to an embodiment of the present disclosure, a method performed by a wireless device in a wireless communication system comprises: registering to a first network and a second network; receiving a logging instruction for out-of-service; detecting an out-of-service coverage upon switching to the first network from the second network; generating logging information for the detected out-of-service coverage based on the logging instruction for out-of-service, wherein the logging information comprises information informing that the out-of-service coverage is detected upon switching to the first network from the second network; and transmitting the logging information.

According to an embodiment of the present disclosure, a wireless device in a wireless communication system comprises: a transceiver; a memory; and at least one processor operatively coupled to the transceiver and the memory, and configured to: register to a first network and a second network; control the transceiver to receive a logging instruction for out-of-service; detect an out-of-service coverage upon switching to the first network from the second network; generate logging information for the detected out-of-service coverage based on the logging instruction for out-of-service, wherein the logging information comprises information informing that the out-of-service coverage is detected upon switching to the first network from the second network; and control the transceiver to transmit the logging information.

According to an embodiment of the present disclosure, a non-transitory computer-readable medium has stored thereon a plurality of instructions. The plurality of instructions, when executed by a processor of a wireless device, cause the wireless device to: register to a first network and a second network; receive a logging instruction for out-of-service; detect an out-of-service coverage upon switching to the first network from the second network; generate logging information for the detected out-of-service coverage based on the logging instruction for out-of-service, wherein the logging information comprises information informing that the out-of-service coverage is detected upon switching to the first network from the second network; and transmit the logging information.

Advantageous Effect

The present disclosure can have various advantageous effects.

For example, when the network provides a configuration to perform a logged measurement to the UE which is capable to support MUSIM operation, in addition to the logged measurement result, the UE can provide an indication that the out-of-service coverage has been entered before switching MUSIM operation in a logged measurement report so that the network can assume that the actual size/area of the out-of-service coverage is bigger than the reported size/area. Therefore, the network can prevent misinterpretation of the size/area of the out-of-service coverage by the indication in the logged measurement report.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION OF EXEMPLARY EMBODIMENTS

Figure 1:
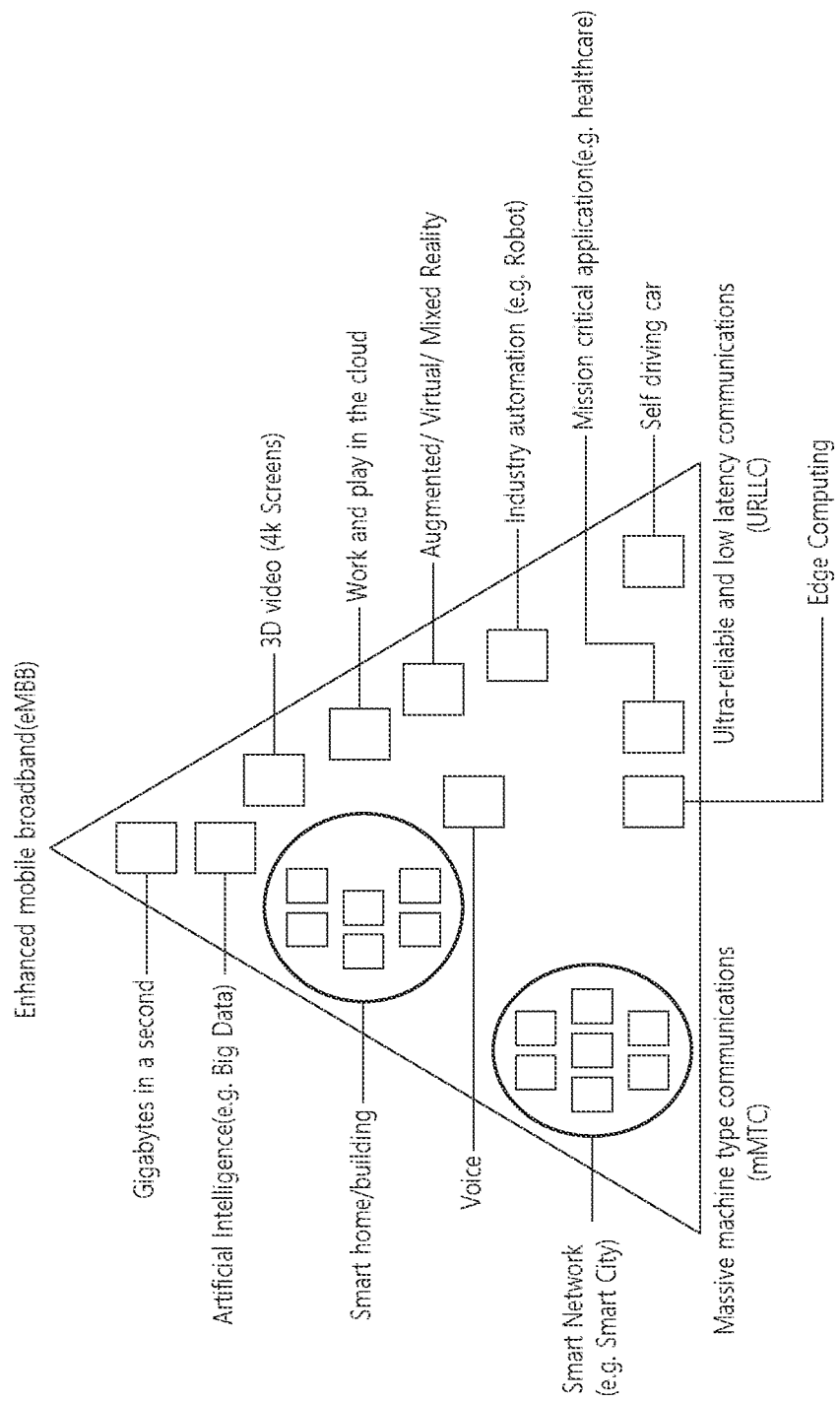
FIG. 1 shows examples of 5G usage scenarios to which the technical features of the present disclosure can be applied.

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Throughout the disclosure, the terms 'radio access network (RAN) node', 'base station', 'eNB', 'gNB' and 'cell' may be used interchangeably. Further, a UE may be a kind of a wireless device, and throughout the disclosure, the terms 'UE' and 'wireless device' may be used interchangeably.

Throughout the disclosure, the terms 'cell quality', 'signal strength', 'signal quality', 'channel state', 'channel quality', ' channel state/reference signal received power (RSRP)' and ' reference signal received quality (RSRQ)' may be used interchangeably.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings.

FIG. 1 shows examples of 5G usage scenarios to which the technical features of the present disclosure can be applied.

The 5G usage scenarios shown in FIG. 1 are only exemplary, and the technical features of the present disclosure can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

NR supports multiple numerology (or, subcarrier spacing (SCS)) to support various 5G services. For example, when the SCS is 15 kHz, wide area in traditional cellular bands may be supported. When the SCS is 30 kHz/60 kHz, dense-urban, lower latency and wider carrier bandwidth may be supported. When the SCS is 60 kHz or higher, a bandwidth greater than 24.25 GHz may be supported to overcome phase noise.

The NR frequency band may be defined as two types of frequency range, i.e., FR1 and FR2. The numerical value of the frequency range may be changed. For example, the frequency ranges of the two types (FR1 and FR2) may be as shown in Table 1 below. For ease of explanation, in the frequency ranges used in the NR system, FR1 may mean "sub 6 GHz range", FR2 may mean "above 6 GHz range," and may be referred to as millimeter wave (mmW).

TABLE 1

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Figure 2:
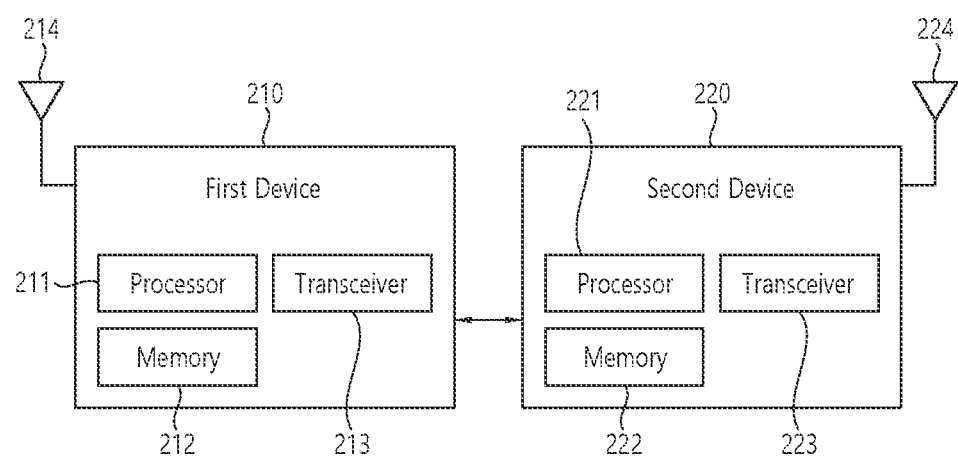
FIG. 2 shows an example of a wireless communication system to which the technical features of the present disclosure can be applied.

FIG. 2 shows an example of a wireless communication system to which the technical features of the present disclosure can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the first device described throughout the disclosure. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled by the processor 211 to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the second device 220 described throughout the disclosure. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled by the processor 221 to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
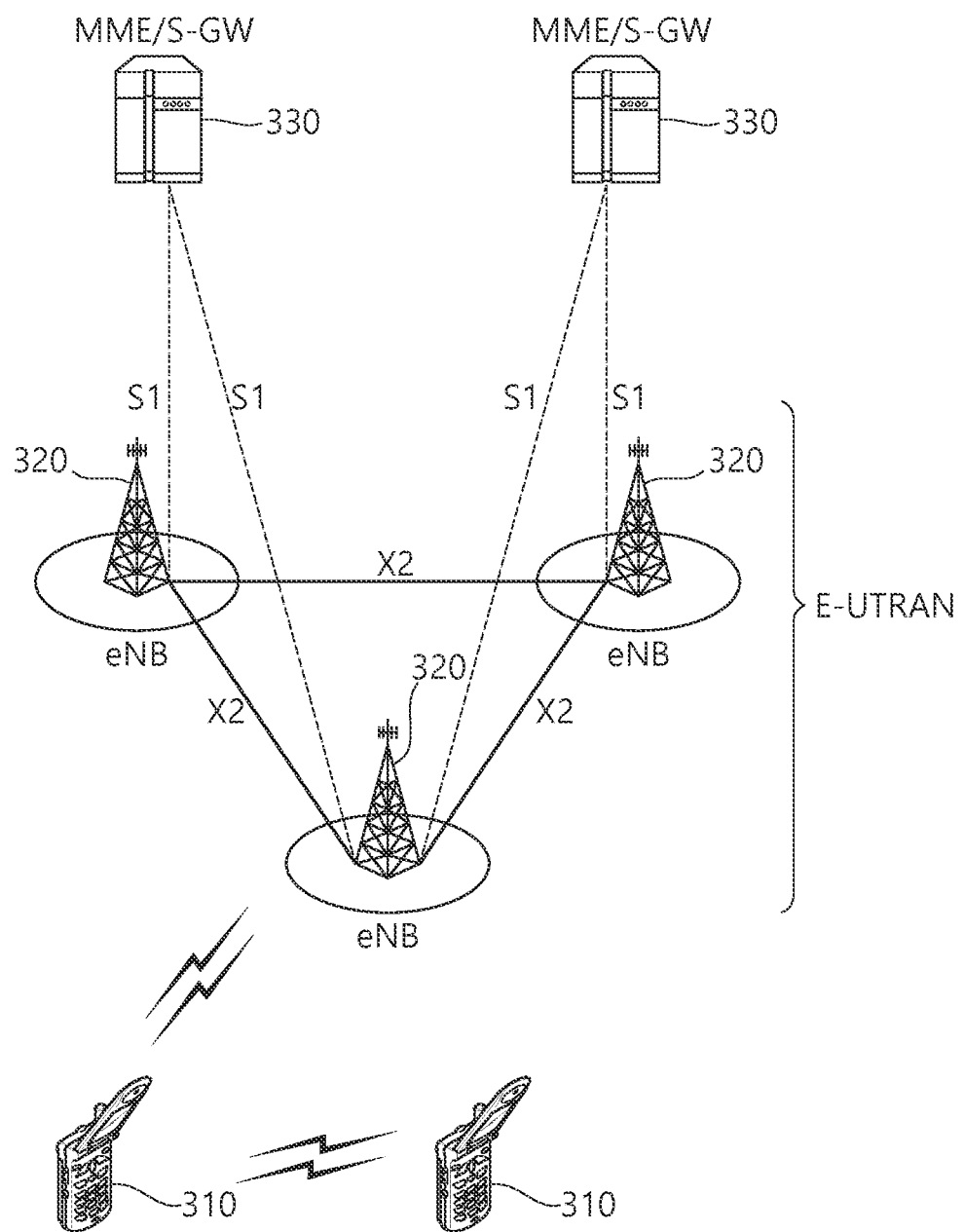
FIG. 3 shows an example of a wireless communication system to which the technical features of the present disclosure can be applied.

FIG. 3 shows an example of a wireless communication system to which the technical features of the present disclosure can be applied.

Specifically, FIG. 3 shows a system architecture based on an evolved-UMTS terrestrial radio access network (E-UTRAN). The aforementioned LTE is a part of an evolved-UTMS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
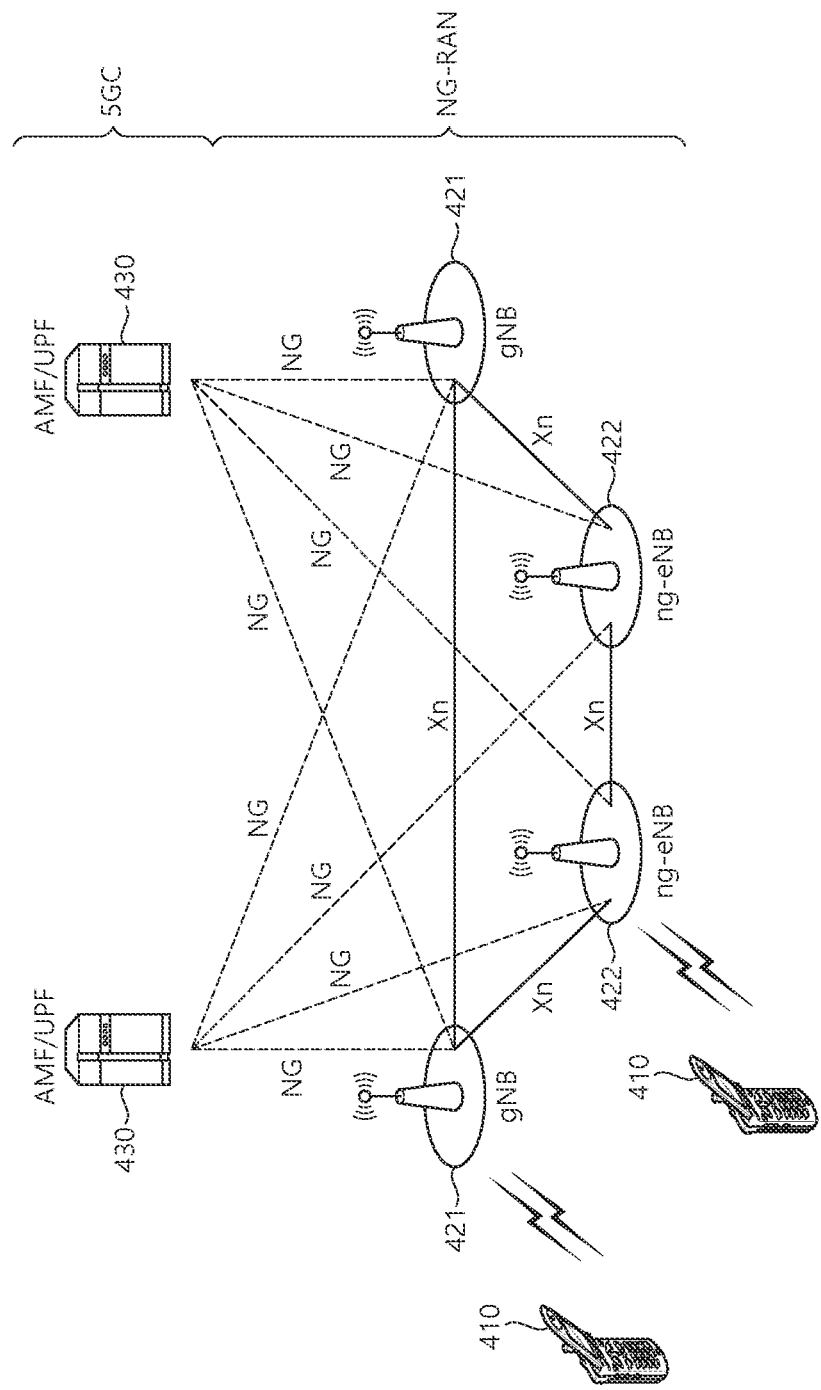
FIG. 4 shows another example of a wireless communication system to which the technical features of the present disclosure can be applied.

FIG. 4 shows another example of a wireless communication system to which the technical features of the present disclosure can be applied.

Specifically, FIG. 4 shows a system architecture based on a 5G NR. The entity used in the 5G NR (hereinafter, simply referred to as "NW") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
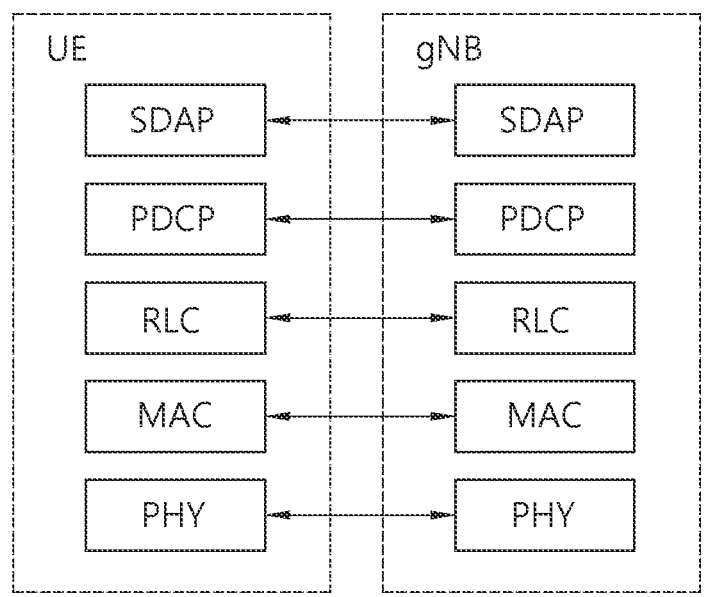
FIG. 5 shows a block diagram of a user plane protocol stack to which the technical features of the present disclosure can be applied.
Figure 6:
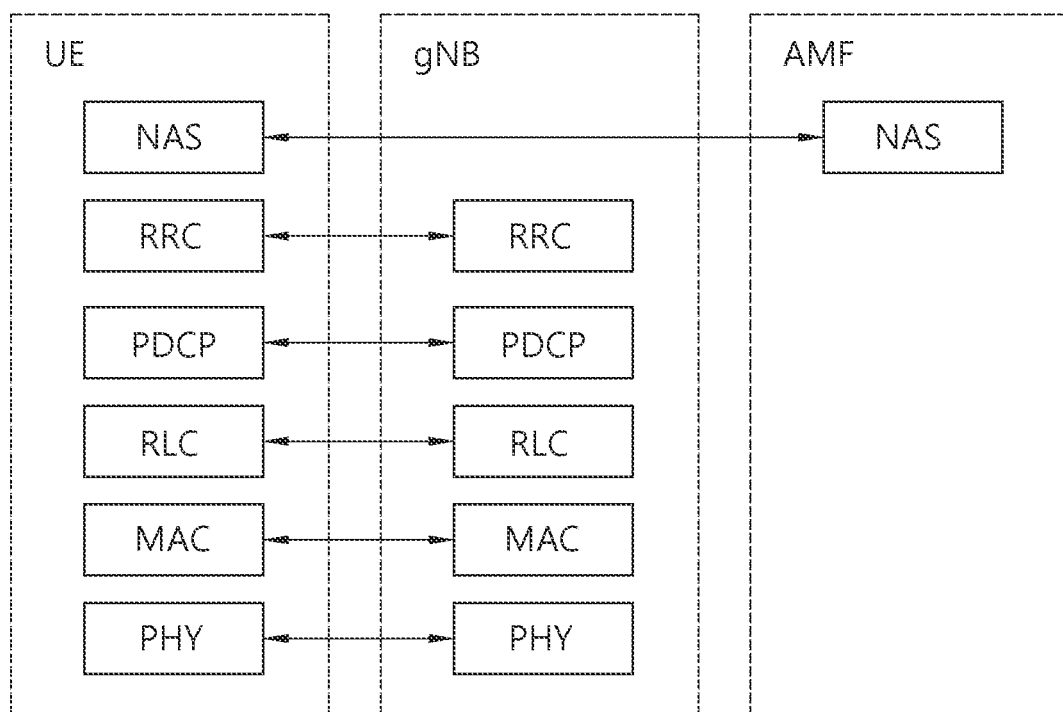
FIG. 6 shows a block diagram of a control plane protocol stack to which the technical features of the present disclosure can be applied.

FIG. 5 shows a block diagram of a user plane protocol stack to which the technical features of the present disclosure can be applied. FIG. 6 shows a block diagram of a control plane protocol stack to which the technical features of the present disclosure can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain. A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Figure 7:
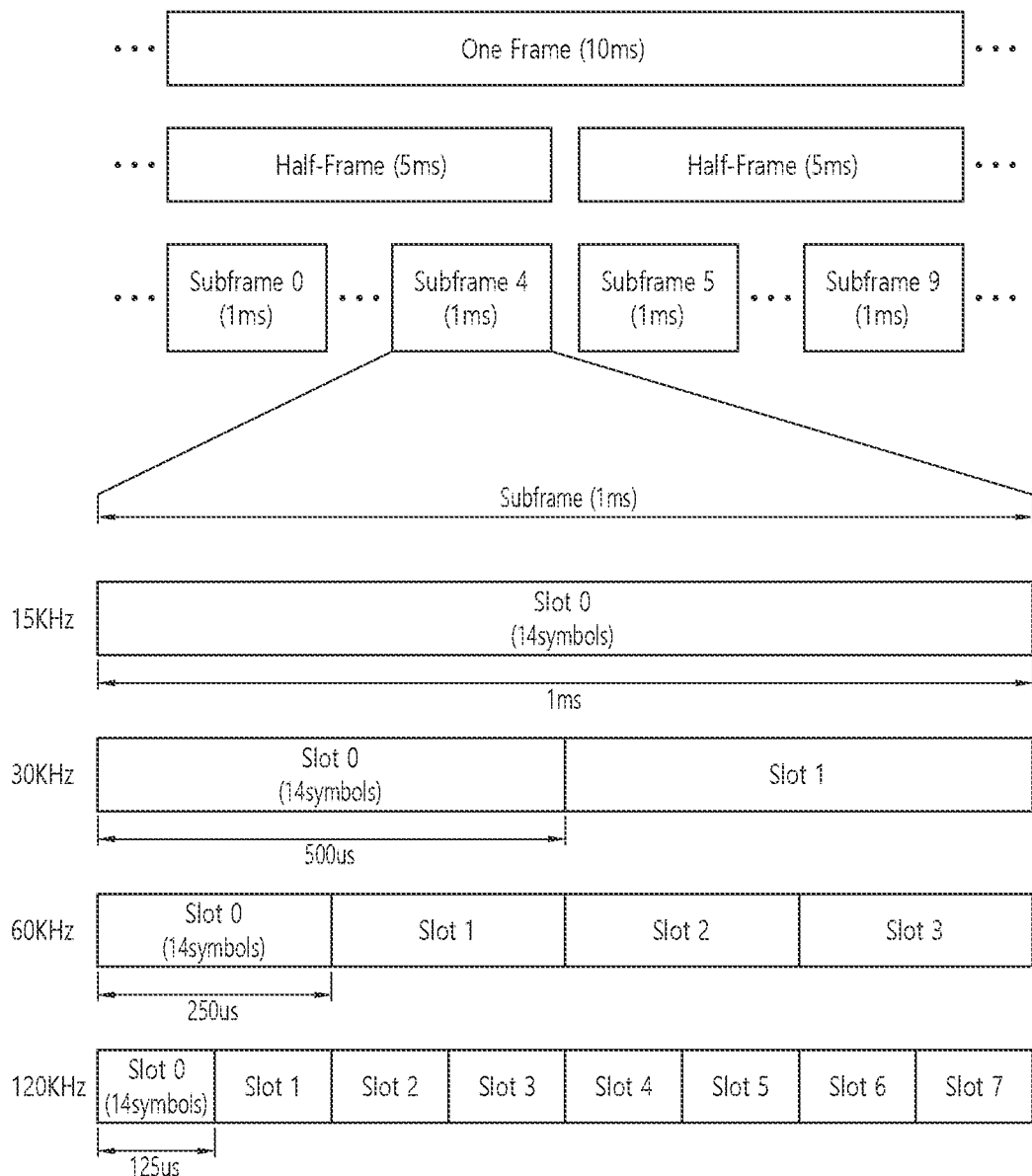
FIG. 7 illustrates a frame structure in a 3GPP based wireless communication system.

FIG. 7 illustrates a frame structure in a 3GPP based wireless communication system.

The frame structure illustrated in FIG. 7 is purely exemplary and the number of subframes, the number of slots, and/or the number of symbols in a frame may be variously changed. In the 3GPP based wireless communication system, an OFDM numerology (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g. a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 7, downlink and uplink transmissions are organized into frames. Each frame has Tf=10 ms duration. Each frame is divided into two half-frames, where each of the half-frames has 5 ms duration. Each half-frame consists of 5 subframes, where the duration Tsf per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2u*15$ kHz. The following table shows the number of OFDM symbols per slot, the number of slots per frame, and the number of slots per for the normal CP, according to the subcarrier spacing $\Delta f = 2u*15$ kHz.

TABLE 3

| u | Nslotsymb | Nframe,uslot | Nsubframe,uslot |
|---|---|---|---|
| 0 | 14 | 10 | 1 |
| 1 | 14 | 20 | 2 |
| 2 | 14 | 40 | 4 |

TABLE 3-continued

| u | Nslotsymb | Nframe,uslot | Nsubframe,uslot |
|---|---|---|---|
| 3 | 14 | 80 | 8 |
| 4 | 14 | 160 | 16 |

The following table shows the number of OFDM symbols per slot, the number of slots per frame, and the number of slots per for the extended CP, according to the subcarrier spacing Δf=2u*15 kHz.

TABLE 4

| u | Nslotsymb | Nframe,uslot | Nsubframe,uslot |
|---|---|---|---|
| 2 | 12 | 40 | 4 |

A slot includes plural symbols (e.g., 14 or 12 symbols) in the time domain. For each numerology (e.g. subcarrier spacing) and carrier, a resource grid of Nsize,ugrid, x*NRBsc subcarriers and Nsubframe,usymb OFDM symbols is defined, starting at common resource block (CRB) Nstart,ugrid indicated by higher-layer signaling (e.g. radio resource control (RRC) signaling), where Nsize,ugrid,x is the number of resource blocks (RBs) in the resource grid and the subscript x is DL for downlink and UL for uplink. NRBsc is the number of subcarriers per RB. In the 3GPP based wireless communication system, NRBsc is 12 generally. There is one resource grid for a given antenna port p, subcarrier spacing configuration u, and transmission direction (DL or UL). The carrier bandwidth Nsize,ugrid for subcarrier spacing configuration u is given by the higher-layer parameter (e.g. RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index 1 representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to NsizeBWP,i−1, where i is the number of the bandwidth part. The relation between the physical resource block nPRB in the bandwidth part i and the common resource block nCRB is as follows: nPRB=nCRB+NsizeBWP,i, where NsizeBWP,i is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

In the present disclosure, the term "cell" may refer to a geographic area to which one or more nodes provide a communication system, or refer to radio resources. A "cell" of a geographic area may be understood as coverage within which a node can provide service using a carrier and a "cell" as radio resources (e.g. time-frequency resources) is associated with bandwidth (BW) which is a frequency range configured by the carrier. The "cell" associated with the radio resources is defined by a combination of downlink resources and uplink resources, for example, a combination of a downlink (DL) component carrier (CC) and a uplink (UL) CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In carrier aggregation (CA), two or more CCs are aggregated. A UE may simultaneously receive or transmit on one or multiple CCs depending on its capabilities. CA is supported for both contiguous and non-contiguous CCs. When CA is configured the UE only has one radio resource control (RRC) connection with the network. At RRC connection establishment/re-establishment/handover, one serving cell provides the non-access stratum (NAS) mobility information, and at RRC connection re-establishment/handover, one serving cell provides the security input. This cell is referred to as the Primary Cell (PCell). The PCell is a cell, operating on the primary frequency, in which the UE either performs the initial connection establishment procedure or initiates the connection re-establishment procedure. Depending on UE capabilities, Secondary Cells (SCells) can be configured to form together with the PCell a set of serving cells. An SCell is a cell providing additional radio resources on top of Special Cell. The configured set of serving cells for a UE therefore always consists of one PCell and one or more SCells. For dual connectivity operation, the term Special Cell (SpCell) refers to the PCell of the master cell group (MCG) or the PSCell of the secondary cell group (SCG). An SpCell supports PUCCH transmission and contention-based random access, and is always activated. The MCG is a group of serving cells associated with a master node, comprising of the SpCell (PCell) and optionally one or more SCells. The SCG is the subset of serving cells associated with a secondary node, comprising of the PSCell and zero or more SCells, for a UE configured with dual connectivity (DC). For a UE in RRC_CONNECTED not configured with CA/DC there is only one serving cell comprising of the PCell. For a UE in RRC_CONNECTED configured with CA/DC the term "serving cells" is used to denote the set of cells comprising of the SpCell(s) and all SCells. In DC, two MAC entities are configured in a UE: one for the MCG and one for the SCG.

Figure 8:
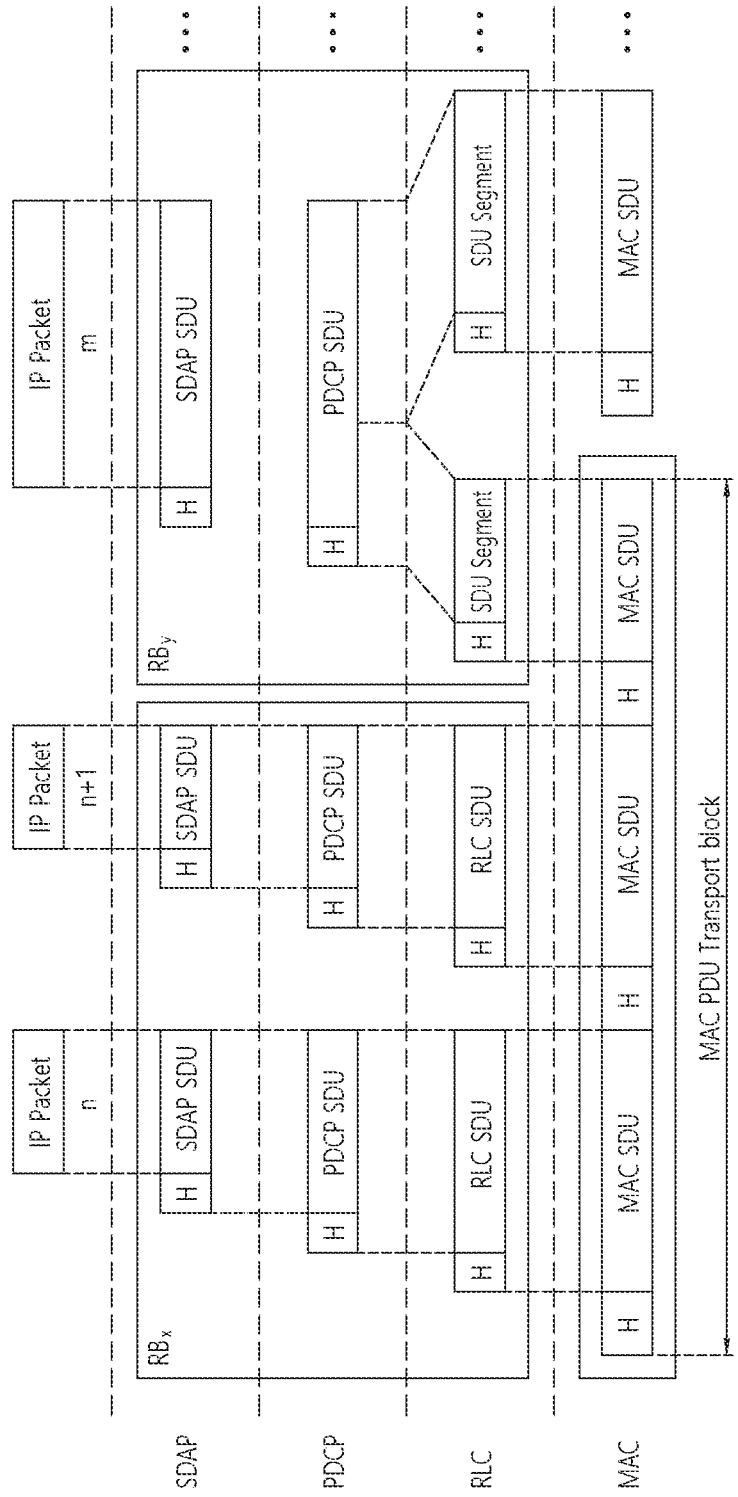
FIG. 8 illustrates a data flow example in the 3GPP NR system.

FIG. 8 illustrates a data flow example in the 3GPP NR system.

In FIG. 8, "RB" denotes a radio bearer, and "H" denotes a header. Radio bearers are categorized into two groups: data radio bearers (DRB) for user plane data and signalling radio bearers (SRB) for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Data unit(s) (e.g. PDCP SDU, PDCP PDU, RLC SDU, RLC PDU, RLC SDU, MAC SDU, MAC CE, MAC PDU) in the present disclosure is(are) transmitted/received on a physical channel (e.g. PDSCH, PUSCH) based on resource allocation (e.g. UL grant, DL assignment). In the present disclosure, uplink resource allocation is also referred to as uplink grant, and downlink resource allocation is also referred to as downlink assignment. The resource allocation includes time domain resource allocation and frequency domain resource allocation. In the present disclosure, an uplink grant is either received by the UE dynamically on PDCCH, in a Random Access Response, or configured to the UE semi-persistently by RRC. In the present disclosure, downlink assignment is either received by the UE dynamically on the PDCCH, or configured to the UE semi-persistently by RRC signalling from the BS.

Figure 9:
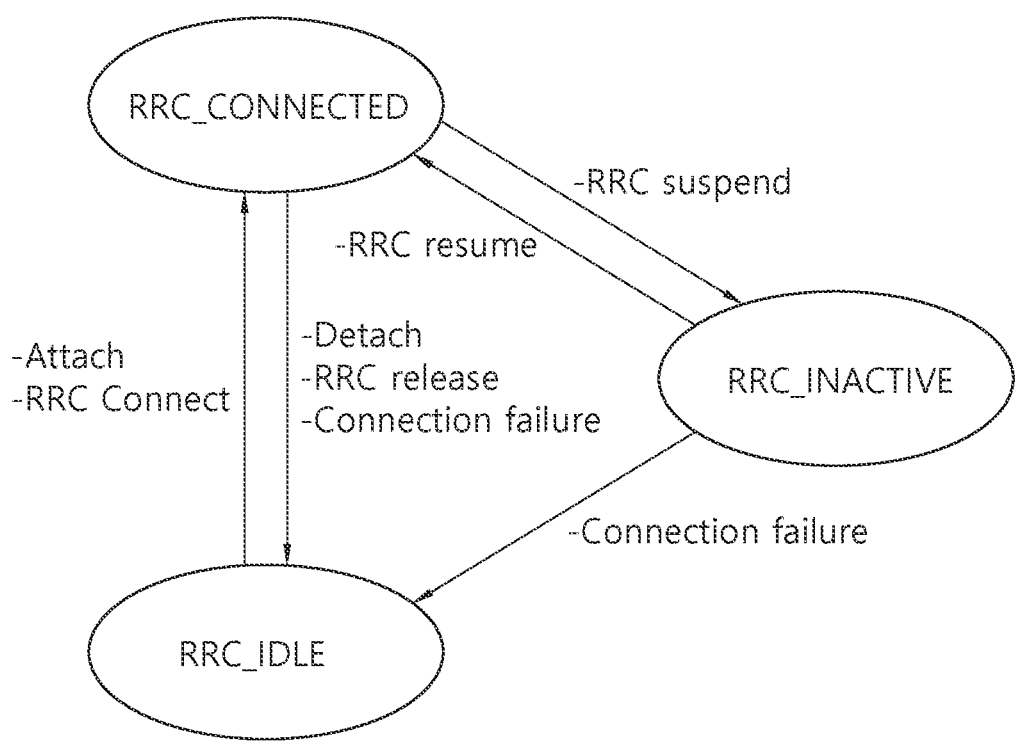
FIG. 9 shows an example of possible RRC states in a wireless communication system to which technical features of the present disclosure can be applied.

FIG. 9 shows an example of possible RRC states in a wireless communication system to which technical features of the present disclosure can be applied.

Referring to FIG. 9, there may be 3 possible RRC states in a wireless communication system (i.e., RRC_IDLE, RRC_CONNECTED and/or RRC_INACTIVE).

In RRC_IDLE (or, idle mode/state), RRC context for communication between a UE and a network may not be established in RAN, and the UE may not belong to a specific cell. Also, in RRC_IDLE, there is no core network connection for the UE. Since the device remains in sleep mode in most of the time to reduce battery consumption, data transfer between the UE and the network may not occur. UEs in RRC_IDLE may periodically wake-up to receive paging messages from the network. Mobility may be handled by the UE through cell reselection. Since uplink synchronization is not maintained, the UE may not perform uplink transmission other than transmissions for random access (e.g., random access preamble transmission) to move to RRC_CONNECTED.

In RRC_CONNECTED (or, connected state/mode), RRC context for communication between a UE and a network may be established in RAN. Also, in RRC_CONNECTED, core network connection is established for the UE. Since the UE belongs to a specific cell, cell-radio network temporary identifier (C-RNTI) for signalings between the UE and the network may be configured for the UE. Data transfer between the UE and the network may occur. Mobility may be handled by the network—that is, the UE may provide measurement report to the network, and the network may transmit mobility commands to the UE to perform a mobility. Uplink time alignment may need to be established based on a random access and maintained for data transmission.

In RRC_INACTIVE (or, inactive state/mode), RRC context for communication between a UE and a network may be kept in RAN. Data transfer between the UE and the network may not occur. Since core network connection may also be kept for the UE, the UE may fast transit to a connected state for data transfer. In the transition, core network signalling may not be needed. The RRC context may be already established in the network and idle-to-active transitions can be handled in the RAN. The UE may be allowed to sleep in a similar way as in RRC_IDLE, and mobility may be handled through cell reselection without involvement of the network. The RRC_INACTIVE may be construed as a mix of the idle state and the connected state.

As illustrated in FIG. 9, the UE may transit to RRC_CONNECTED from RRC_IDLE by performing initial attach procedure or RRC connection establishment procedure. The UE may transit to RRC_IDLE from RRC_CONNECTED when detach, RRC connection release (e.g., when the UE receives RRC release message) and/or connection failure (e.g., radio link failure (RLF)) has occurred. The UE may transit to RRC_INACTIVE from RRC_CONNECTED when RRC connection is suspended (e.g., when the UE receives RRC release message including a suspend configuration), and transit to RRC_CONNECTED from RRC_INACTIVE when RRC connection is resume by performing RRC connection resume procedure. The UE may transit to RRC_IDLE from RRC_INACTIVE when connection failure such as RLF has occurred.

Hereinafter, the minimization of driving tests (MDT) is described.

The MDT is to test by operators for coverage optimization by using a UE instead of a vehicle. The coverage may be varied according to a location of a base station, an arrangement of a neighbor building, and a use case scenario of a user. Therefore, the operator may need to perform a driving test, which consumes a lot of cost and resources. The MDT may refer to a scheme of measuring the coverage by the operator using the UE.

The MDT may comprise a logged MDT and an immediate MDT. According to the logged MDT, the UE may perform the MDT measurement to obtain a logged measurement and transmit the logged measurement to a network at a particular time point. According to the immediate MDT, the UE may perform the MDT measurement and transmit the result of the measurement to the network when a reporting condition is satisfied. In the logged MDT scheme, the MDT measurement may be performed in the RRC idle mode or RRC inactive mode, whereas in the immediate MDT scheme, the MDT measurement may be performed in the RRC connection mode.

Figure 10:
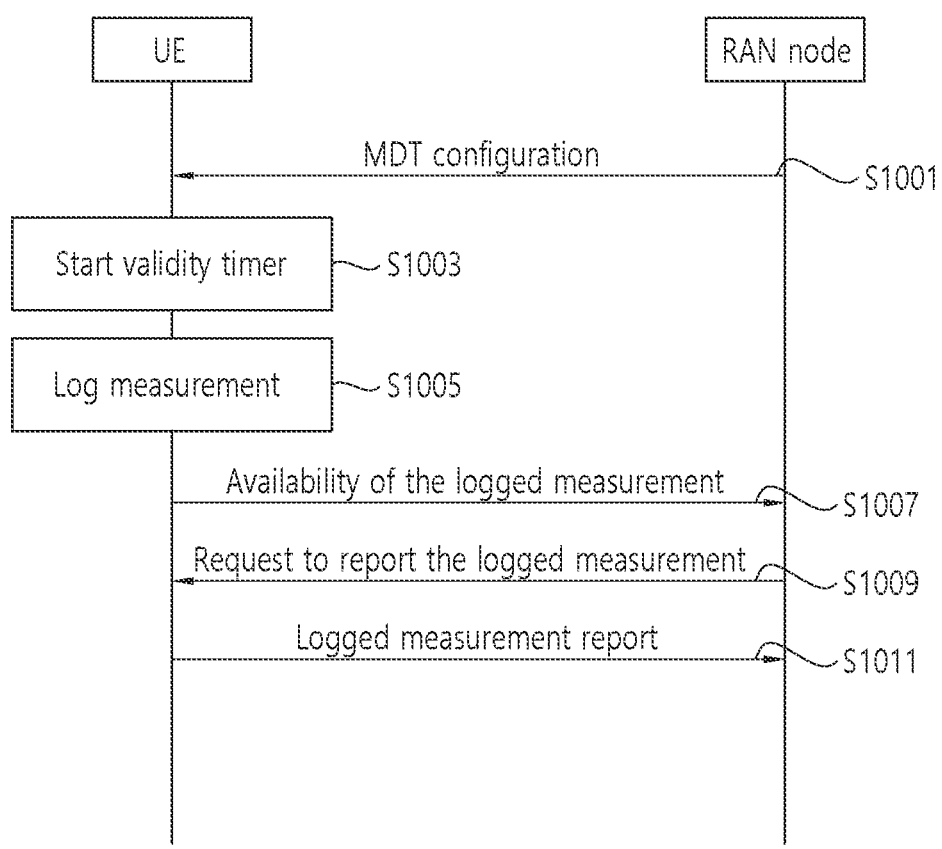
FIG. 10 shows an example of a process for performing an MDT to which technical features of the present disclosure can be applied.

FIG. 10 shows an example of a process for performing an MDT to which technical features of the present disclosure can be applied.

Referring to FIG. 10, in step S1001, a UE may receive a MDT configuration from a network. Throughout the disclosure, the MDT configuration may also be referred to as "logged measurement configuration". The UE may be in the RRC connected mode. Even when the UE transits to the RRC idle mode or RRC inactive mode from the RRC connected mode, the MDT configuration may be maintained, and accordingly, the MDT measurement result may also be maintained.

The MDT configuration may include at least one of a reference time, an area configuration, a configuration for periodic logging or a configuration for event-triggered logging.

The reference time may be used to indicate a reference time used when the UE transmits the logged measurement. The area configuration may indicates an area in which the UE is requested to perform the logging.

The configuration for periodic logging may comprise a logging interval.

The configuration for event-triggered logging may comprise at least one of an event type or a logging interval. The event type may indicate out-of-service (i.e., logging instruction for out-of-service), or a specific event (e.g., event L1). If the event type indicates the specific event, the configuration for event-triggered logging may further comprise information related to the specific event, such as a logging threshold, hysteresis value and/or a time-to-trigger (TTT) value.

Upon receiving the MDT configuration, in step S1003, the UE may start a validity timer. The validity timer may indicate a lifetime of the MDT configuration. That is, the validity timer may indicate a time period during which the MDT configuration is valid. A value of the validity timer may be included in the MDT configuration. Such value may be called a logging duration. When the UE receives the MDT configuration, the UE may set the value of the validity timer as the logging duration and start the validity timer.

In step S1005, the UE may transit to the RRC idle mode/RRC inactive mode and then log the measurement information based on the MDT configuration while the validity timer is running.

For example, if a periodic logging is configured (i.e., MDT configuration comprises a configuration for periodic logging), the UE may log MDT measurement information (i.e., perform a logging or store/generate logging information) at regular time intervals defined by the logging interval in the configuration for periodic logging.

For another example, if an event-triggered logging is configured (i.e., MDT configuration comprises a configuration for event-triggered logging) and the event type indicates out-of-service, the UE may log MDT measurement information at regular time intervals as defined by the logging interval in the configuration for event-triggered logging only when the UE detects an out-of-service coverage. The out-of-service coverage may be detected if:
 the UE is not able to detect any cells for which S criteria is fulfilled;
 no suitable cell or no acceptable cell can be found;
 the UE is in any cell selection state;
 the UE is in out-of-service; or
 if a serving cell quality (i.e., RSRP, RSRQ or SINR) is lower than a threshold configured by the network.

For another example, if an event-triggered logging is configured (i.e., MDT configuration comprises a configuration for event-triggered logging) and the event type indicates out-of-service, the UE may log MDT measurement information immediately upon transitioning from the any cell selection state to the camped normally state.

For another example, if an event-triggered logging is configured (i.e., MDT configuration comprises a configuration for event-triggered logging) and the event type indicates an event L1, the UE may log MDT measurement information at regular time intervals as defined by the logging interval in the configuration for event-triggered logging only when a condition related to the event L1 is met. The condition related to the event L1 may comprise a condition that a measurement result of a serving cell plus the hysteresis value is lower than the logging threshold for the TTT value. In some cases, the hysteresis value may be 0.

In the above examples, the MDT measurement information may comprise at least one of a cell identifier, a signal quality of a cell, a signal strength, a measurement time or a measurement location. The signal quality/signal strength may comprise reference signal received power (RSRP), reference signal received quality (RSRQ), received signal code power (RSCP), and/or Ec/No.

In step S1007, if there are the logged MDT measurement information, the UE may send an availability of the logged measurement information to a RAN node when the UE transits from the RRC idle mode/RRC inactive mode to the RRC connection mode. The UE may send the availability of the logged measurement information to the network when the RRC connection is established, re-established, or re-configured.

In step S1009, the RAN node which receives that the logged MDT measurement information exists from the UE may request the UE to transmit the logged MDT measurement information. The network which learns about the logged measurement information may transmit an information request (e.g., UE information request) for requesting the reporting of the logged measurement information to the UE.

In step S1001, after/upon receiving the request to report the logged measurement information, the UE may transmit a logged measurement report comprising the logged measurement information to the RAN node. For example, the UE may transmit an information response (e.g., UE information response) including the logged measurement information to the RAN node. The logged measurement information may comprise contents measured by the UE while the MDT measurement is performed. The logged measurement information may primarily be related to a wireless environment.

According to various embodiments, when the validity timer expires, the UE may discard the MDT configuration and start a conservation timer. The UE may discard the MDT configuration and stop the MDT measurement. However, the logged measurement information may still be valid and maintained. The conservation timer may indicate a lifetime of the logged measurement information. That is, the conservation timer is related to a time period during which the logged measurement information is valid.

When the conservation timer expires, the logged measurement information may be discarded. When a reporting request of the logged measurement information is received from the RAN node during when the conservation timer is running, the UE may report the logged measurement information.

A value of the conservation timer may be fixed. For example, the value of the conservation timer may be 48 hours. Alternatively, the value of the conservation timer may be included in the MDT configuration such that the RAN node may notify the value of the conservation timer to the UE.

When a new MDT configuration is received, the current MDT configuration may be updated to a new MDT configuration and the validity timer may be restarted. Also, the MDT measurement information previously logged according to the previous MDT configuration may be discarded.

In the above, "any cell selection state" is a state in which a UE does not camp on an acceptable cell or a suitable cell. "camped normally state" is a state in which a UE camps on a suitable cell.

The acceptable cell is a cell on which the UE may camp to obtain limited service (originate emergency calls and receive ETWS and CMAS notifications). Such a cell shall not barred and shall fulfil the cell selection criteria (i.e., S criteria) which is the minimum set of requirements to initiate an emergency call and to receive ETWS and CMAS notification in a network.

For UE not operating in SNPN Access Mode, a cell may be considered as a suitable cell if the following conditions are fulfilled:
 The cell is part of either the selected PLMN or the registered PLMN or PLMN of the Equivalent PLMN list, and for that PLMN either:
  The PLMN-ID of that PLMN is broadcast by the cell with no associated CAG-IDs and CAG-only indication in the UE for that PLMN is absent or false;

Allowed CAG list in the UE for that PLMN includes a CAG-ID broadcast by the cell for that PLMN;
The cell selection criteria are fulfilled.
According to the latest information provided by NAS:
The cell is not barred;
The cell is part of at least one TA that is not part of the list of "Forbidden Tracking Areas for Roaming", which belongs to a PLMN that fulfils the first bullet above.

For UE operating in SNPN Access Mode, a cell is considered as suitable if the following conditions are fulfilled:
The cell is part of either the selected SNPN or the registered SNPN of the UE;
The cell selection criteria are fulfilled;
According to the latest information provided by NAS:
The cell is not barred;
The cell is part of at least one TA that is not part of the list of "Forbidden Tracking Areas" which belongs to either the selected SNPN or the registered SNPN of the UE.

The any cell selection state is applicable for RRC_IDLE and RRC_INACTIVE state. In the any cell selection state, the UE shall perform cell selection process to find a suitable cell. If the cell selection process fails to find a suitable cell after a complete scan of all RATs and all frequency bands supported by the UE, the UE not in SNPN AM shall attempt to find an acceptable cell of any PLMN to camp on, trying all RATs that are supported by the UE and searching first for a high-quality cell. The UE, which is not camped on any cell, shall stay in the any cell selection state.

The camped normally state is applicable for RRC_IDLE and RRC_INACTIVE state.

When camped normally, the UE shall perform the following tasks:
monitor the paging channel of the cell according to information broadcast in SIB1;
monitor Short Messages transmitted with P-RNTI over DCI;
monitor relevant System Information;
perform necessary measurements for the cell reselection evaluation procedure;
execute the cell reselection evaluation process on the following occasions/triggers:
1) UE internal triggers, so as to meet the specific performance;
2) When information on the BCCH used for the cell reselection evaluation procedure has been modified.

The cell selection criterion S (or, S criterion/criteria) is fulfilled when Srxlev>0 and Squal>0, where Srxlev=$Q_{rxlevmeas}-(Q_{rxlevmin}+Q_{rxlevminoffset})-P_{compensation}-Qoffset_{temp}$ and Squal=$Q_{qualmeas}-(Q_{qualmin}+Q_{qualminoffset})-Qoffset_{temp}$. Table 5 illustrates a definition of each parameter:

TABLE 5

| | |
|---|---|
| Srxlev | Cell selection RX level value (dB) |
| Squal | Cell selection quality value (dB) |
| $Qoffset_{temp}$ | Offset temporarily applied to a cell |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm). If the UE supports SUL frequency for this cell, $Q_{rxlevmin}$ is obtained from q-RxLevMinSUL, if present, in SIB1, SIB2 and SIB4, additionally, if $Q_{rxlevminoffsetcellSUL}$ is present in SIB3 and SIB4 for the concerned cell, this cell specific offset is added to the corresponding Qrxlevmin to achieve the required minimum RX level in the concerned cell; else $Q_{rxlevmin}$ is obtained from q-RxLevMin in SIB1, SIB2 and SIB4, additionally, if $Q_{rxlevminoffsetcell}$ is present in SIB3 and SIB4 for the concerned cell, this cell specific offset is added to the corresponding Qrxlevmin to achieve the required minimum RX level in the concerned cell. |
| $Q_{qualmin}$ | Minimum required quality level in the cell (dB). Additionally, if $Q_{qualminoffsetcell}$ is signalled for the concerned cell, this cell specific offset is added to achieve the required minimum quality level in the concerned cell. |
| $Q_{rxlevminoffset}$ | Offset to the signalled $Q_{rxlevmin}$ taken into account in the Srxlev evaluation as a result of a periodic search for a higher priority PLMN while camped normally in a VPLMN. |
| $Q_{qualminoffset}$ | Offset to the signalled $Q_{qualmin}$ taken into account in the Squal evaluation as a result of a periodic search for a higher priority PLMN while camped normally in a VPLMN. |
| $P_{compensation}$ | For FR1, if the UE supports the additionalPmax in the NR-NS-PmaxList, if present, in SIB1, SIB2 and SIB4: max($P_{EMAX1} - P_{PowerClass}$, 0) − (min($P_{EMAX2}$, $P_{PowerClass}$) − min($P_{EMAX1}$, $P_{PowerClass}$)) (dB); else: max($P_{EMAX1} - P_{PowerClass}$, 0) (dB) For FR2, $P_{compensation}$ is set to 0. |
| $P_{EMAX1}$, $P_{EMAX2}$ | Maximum TX power level of a UE may use when transmitting on the uplink in the cell (dBm). If UE supports SUL frequency for this cell, $P_{EMAX1}$ and $P_{EMAX2}$ are obtained from the p-Max for SUL in SIB1 and NR-NS-PmaxList for SUL respectively in SIB1, SIB2 and SIB4, else $P_{EMAX1}$ and $P_{EMAX2}$ are obtained from the p-Max and NR-NS-PmaxList respectively in SIB1, SIB2 and SIB4 for normal UL. |
| $P_{PowerClass}$ | Maximum RF output power of the UE (dBm) according to the UE power class. |

The signalled values $Q_{rxlevminoffset}$ rxlevminoffset and $Q_{qualminoffset}$ are only applied when a cell is evaluated for cell selection as a result of a periodic search for a higher priority PLMN while camped normally in a VPLMN. During this periodic search for higher priority PLMN, the UE may check the S criteria of a cell using parameter values stored from a different cell of this higher priority PLMN.

Hereinafter, contents related to a multi-universal subscriber identity module (MUSIM) is described.

Multi-USIM devices (e.g., MUSIM device 1110) have been more and more popular in different countries. The user may have both a personal and a business subscription in one device or have two personal subscriptions in one device for different services.

Figure 11:
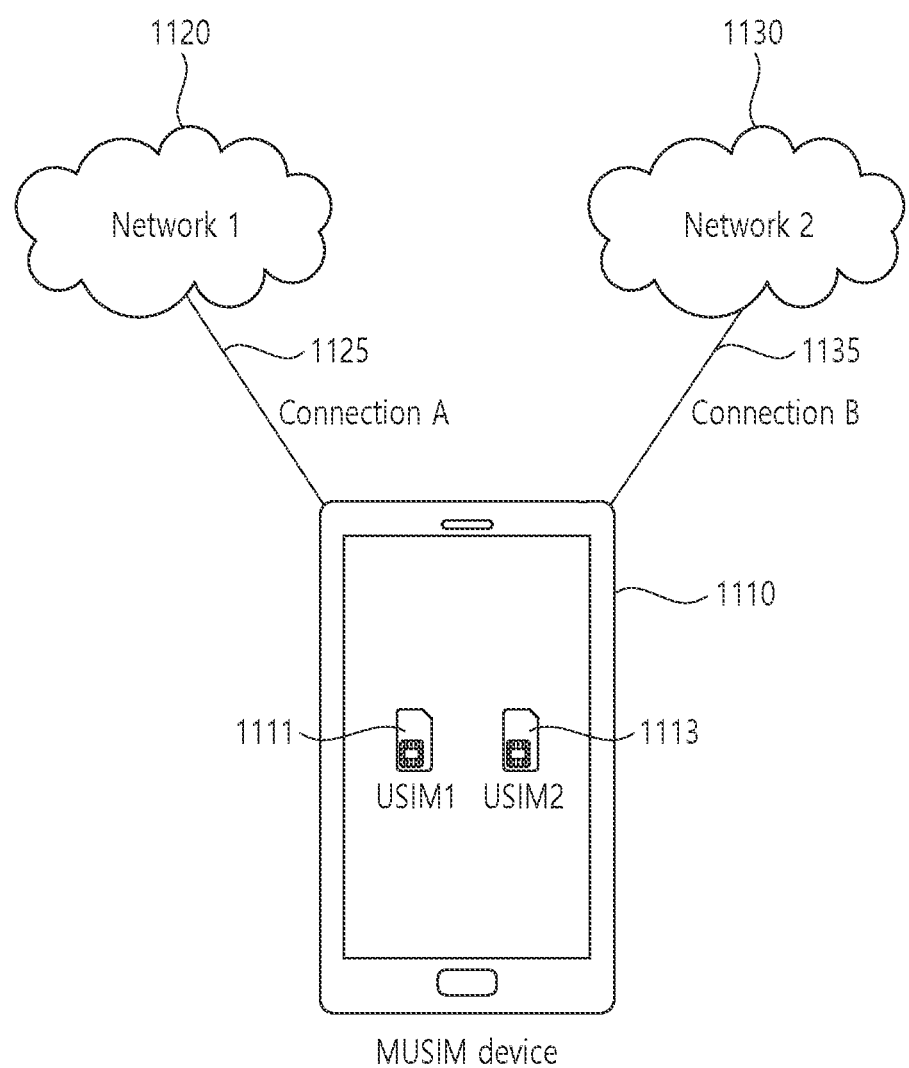
FIG. 11 shows an example of a wireless environment in which a MUSIM device operates according to an embodiment of the present disclosure.

FIG. 11 shows an example of a wireless environment in which a MUSIM device operates according to an embodiment of the present disclosure.

Referring to FIG. 11, MUSIM device 1110 (or, MUSIM UE 1110) may have a plurality of universal subscriber identity modules (USIMs)—USIM1 1111 and USIM2 1113. The MUSIM device 1110 may register to a network 1 1120 based on subscription information in the USIM1 1111 to obtain a connection A 1125 between the network 1 1120 and the MUSIM device 1110. The MSUIM device 1110 may also register to a network 2 1130 based on subscription information in the USIM2 1113 to obtain a connection B 1135 between the network 2 1130 and the MUSIM device 1110. The MUSIM device 1110 may use the USIM1 1111 to perform a communication with the network 1 1120 over the connection A 1125, and use the USIM2 1113 to perform a communication with the network 2 1130 over the connection B 1135.

In a wireless environment in which a MUSIM device operates, the following properties may hold:

- Each registration from the USIMS of a MUSIM device may be handled independently.
- Each registered USIM in the MUSIM device may be associated with a dedicated international mobile equipment identity (IMEI)/permanent equipment identifier (PEI).
- A MUSIM UE may be connected with i) evolved packet system (EPS) on one USIM and 5G system (5GS) on the other USIM; ii) EPS on both USIMs; or iii) 5GS on both USIMs.
- A MUSIM UE may be a single reception (RX)/dual RX/single transmission (TX)/Dual TX UE. Single RX may allow the MUSIM UE to receive traffic from only one network at one time. Dual RX may allow the MUSIM UE to simultaneously receive traffic from two networks. Single TX may allow the MUSIM UE to transmit traffic to one network at one time. Dual TX may allow the MUSIM UE to simultaneously transmit traffic to two networks. The terms single RX/TX and Dual RX/TX do not refer to a device type. A single UE may, as an example, use Dual TX in some cases but Single TX in other case.
- If/when the multiple USIMs in the MUSIM device are served by different serving networks, network coordination between the serving networks may not be required.
- A MUSIM device with different USIMs may be camping with all USIMs on the same serving network RAN node, or the MUSIM device may be camping on different serving networks RAN nodes.
- USIMs may belong to same or different operators. Coordination between involved operators may not be required.

USIM may be a physical SIM or embedded SIM (eSIM).

While actively communicating with a first system/network, a MUSIM UE may need to periodically monitor a second system/network (e.g. to synchronize, read the paging channel, perform measurements, or read the system information). The periodical activity on the second system may or may not have performance impact on the first system the UE is communicating with, depending on the UE implementation (i.e., single reception (Rx) or dual Rx).

In some cases, the UE equipped with different USIMs may have paging collisions which results in missed paging. When the UE receives a page in the second system while actively communicating with the first system, the UE may need to decide whether the UE should respond to this paging or not. When the UE decides to respond to the paging in the second system, the UE may need to stop the current activity in the first system. For example, the first system may suspend or release the ongoing connection with the UE.

Meanwhile, a MUSIM UE may have concurrent registrations associated with several USIMs. While actively communicating with the system associated with a first USIM (e.g., current system, first system and/or first network), the MUSIM UE may determine that the MUSIM UE needs to perform some activity (e.g. respond to a paging, or perform mobility update) in the other system associated with a second USIM(s) (e.g., second system and/or second network).

While the MUSIM UE is communicating with the second network based on the second SIM, information for notifying that the MUSIM UE has been entered an out-of-service coverage may be absent. The network is only able to configure event-based logging/event-triggered logging for detecting the out-of-service coverage without considering the MUSIM operation. That is, the MUSIM UE can just log the out-of-service coverage if the out-of-service coverage is detected on the first system/network after switching the MUSIM operation from the second system/network to the first system/network. However, in fact, the MUSIM UE may have entered the out-of-service coverage while the MUSIM UE is communicating with the second system/network, i.e., before actually switching the MUSIM operation from the second system/network to the first system/network. Then, the MUSIM UE cannot indicate information that the MUSIM UE had entered the out-of-service coverage before switching the MUSIM operation from the second system/network to the first system/network. Due to lack of this information, the network, i.e. the first system/network, just interprets the logging information for the out-of-service coverage which may be wrong to the actual size/area of the out-of-service coverage.

Therefore, according to various embodiments of the present disclosure, while performing MUSIM operation, the UE may store (and/or log) logged measurement information with out-of-service coverage information if the network indicates the UE to acquire the out-of-service coverage information for logged measurement and the UE detects that the UE is in the out-of-service coverage. The UE may additionally set a new indication in the out-of-service coverage information indicating that the UE may have entered the out-of-service coverage in the second network before the UE detects the out-of-service coverage as soon as switching the MUSIM operation from the first network to the second network.

Figure 12:
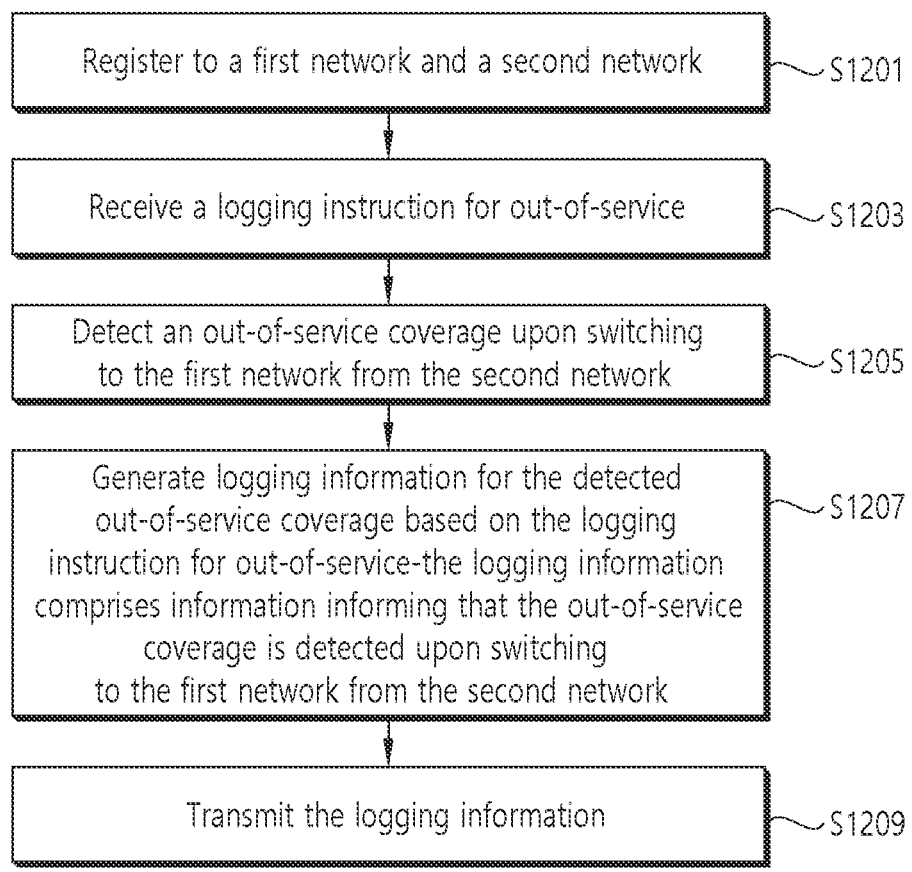
FIG. 12 shows an example of a method performed by a wireless device according to an embodiment of the present disclosure.

FIG. 12 shows an example of a method performed by a wireless device according to an embodiment of the present disclosure. Steps illustrated in FIG. 12 may also be performed by a UE.

Referring to FIG. 12, in step S1201, the wireless device may register to a first network and a second network.

In step S1203, the wireless device may receive a logging instruction for out-of-service. For example, the wireless device may receive a logging instruction for out-of-service from the first network.

In step S1205, the wireless device may detect an out-of-service coverage upon switching to the first network from the second network. For example, the wireless device may detect the out-of-service coverage while the wireless device operates on the first network.

In step S1207, the wireless device may generate logging information for the detected out-of-service coverage based on the logging instruction for out-of-service. The logging information may comprise information informing that the out-of-service coverage is detected upon switching to the first network from the second network.

In step S1209, the wireless device may transmit the logging information. The wireless device may transmit the logging information to at least one of the first network or the second network.

According to various embodiments, the wireless device may be equipped with multiple universal subscriber identity modules (MUSIM) including a first USIM related to the first network and a second USIM related to the second. The wireless device may register to the first network based on the first USIM. The wireless device may register to the second network based on the second USIM.

According to various embodiments, the wireless device may perform an operation on the first network. The wireless device may receive a paging from the second network while performing the operation on the first network. Upon receiving the paging from the second network, the wireless device may establish a connection with the second network. The wireless device may perform an operation on the second network based on the connection with the second network.

According to various embodiments, the operation on the first network may comprise at least one of a connected mode operation, an inactive mode operation or an idle mode operation performed on the first network based on the first SIM. The operation on the second network may comprise at least one of a connected mode operation, an inactive mode operation or an idle mode operation performed on the second network based on the second SIM.

According to various embodiments, the wireless device may perform a logging of measurement information on the first network while performing the operation on the second network. The wireless device may transmit, to the second network, the logged measurement information on the first network.

According to various embodiments, to switch to the first network from the second network, the wireless device may release the connection with the second network after the operation on the second network is completed. The wireless device may perform an operation on the first network after releasing the connection with the second network.

According to various embodiments, the logging instruction for out-of-service may instruct the wireless device to generate the logging information when detecting the out-of-service coverage.

According to various embodiments, the wireless device may detect the out-of-service coverage if/when:
- the wireless device is not able to detect any cells for which cell selection criteria is fulfilled;
- no suitable cell or no acceptable cell is found;
- the wireless device is in any cell selection state; or
- a serving cell quality is lower than a threshold configured by a network.

According to various embodiments, the wireless device may receive a configuration for event-triggered logging comprising a logging interval and the logging instruction for out-of-service. The wireless device may generate, based on the logging instruction for out-of-service, the logging information at regular time intervals determined by the logging interval when detecting the out-of-service coverage.

According to various embodiments, to generate the logging information for the detected out-of-service coverage, the wireless device may log measurement information when detecting the out-of-service coverage, based on the logging instruction for out-of-service. The logged measurement information may correspond to the logging information.

According to various embodiments, the logging information may comprise at least one of a cell identifier, a signal quality of a cell, a measurement time or a measurement location.

According to various embodiments, the information informing that the out-of-service coverage is detected upon switching to the first network from the second network may comprise information informing that the wireless device has entered the out-of-service coverage while performing a communication with the second network.

According to various embodiments, the logging information for the detected out-of-service coverage may be used to identify an area or size of the out-of-service coverage.

According to various embodiments, the wireless device may register to both a first network and a second network. The wireless device may receive a logged measurement configuration including an event-based logging information to detect out-of-service coverage (i.e., logging instruction for out-of-service) from the first network. The wireless device may switch an operation from the first network to the second network. The wireless device may detect out-of-service coverage upon switching the operation back to the first network from the second network. The wireless device may log out-of-service coverage information based on the event-based logging information. The out-of-service coverage information may include an indication that the wireless device has entered the out-of-service coverage while performing the operation with the second network. The wireless device may report logging information including the out-of-service coverage information after establishing a connection with the first network.

Figure 13:
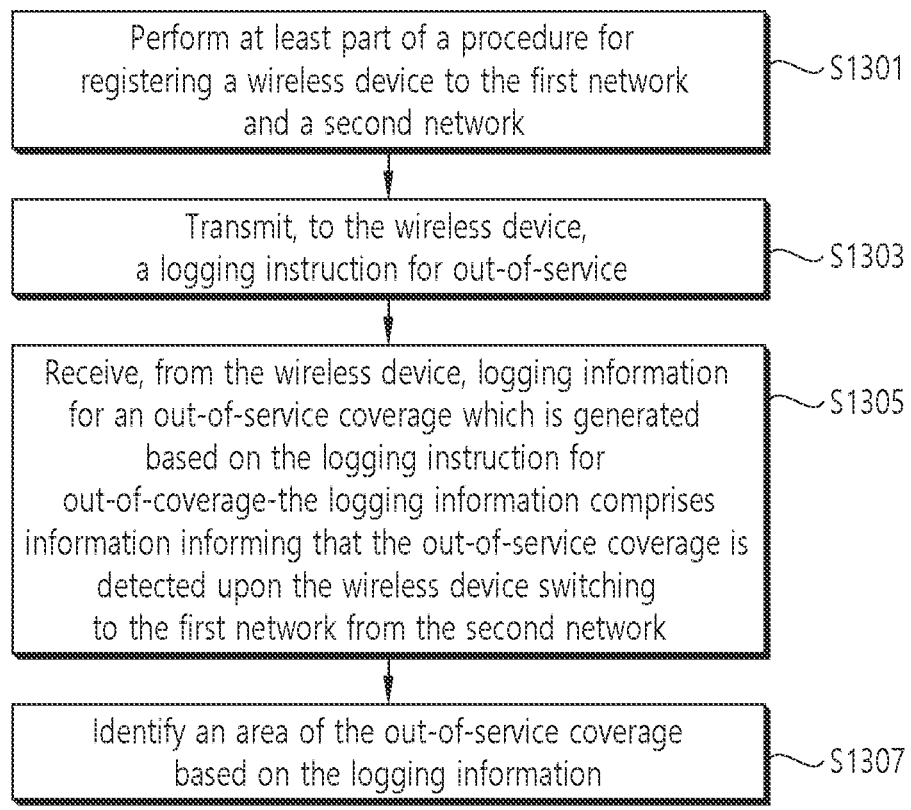
FIG. 13 shows an example of a method performed by a base station (BS) in a first network according to an embodiment of the present disclosure.

FIG. 13 shows an example of a method performed by a base station (BS) in a first network according to an embodiment of the present disclosure.

Referring to FIG. 13, in step S1301, the BS may perform at least part of a procedure for registering a wireless device to the first network and a second network.

In step S1303, the BS may transmit, to the wireless device, a logging instruction for out-of-service.

In step S1305, the BS may receive, from the wireless device, logging information for an out-of-service coverage which is generated based on the logging instruction for out-of-coverage. The logging information may comprise information informing that the out-of-service coverage is detected upon the wireless device switching to the first network from the second network.

In step S1307, the BS may identify an area of the out-of-service coverage based on the logging information.

The BS in FIG. 13 may be an example of a second device 220 in FIG. 2, and therefore, steps of the BS as illustrated in FIG. 13 may be implemented by the second device 220. For example, the processor 221 may be configured to perform at least part of a procedure for registering a wireless device to the first network and a second network. The processor 221 may be configured to control the transceiver 223 to transmit, to the wireless device, a logging instruction for out-of-service. The processor 221 may be configured to control the transceiver 223 to receive, from the wireless device, logging information for an out-of-service coverage which is generated based on the logging instruction for out-of-coverage. The logging information may comprise information informing that the out-of-service coverage is detected upon the wireless device switching to the first network from the second network. The processor 221 may be configured to identify an area of the out-of-service coverage based on the logging information.

Figure 14:
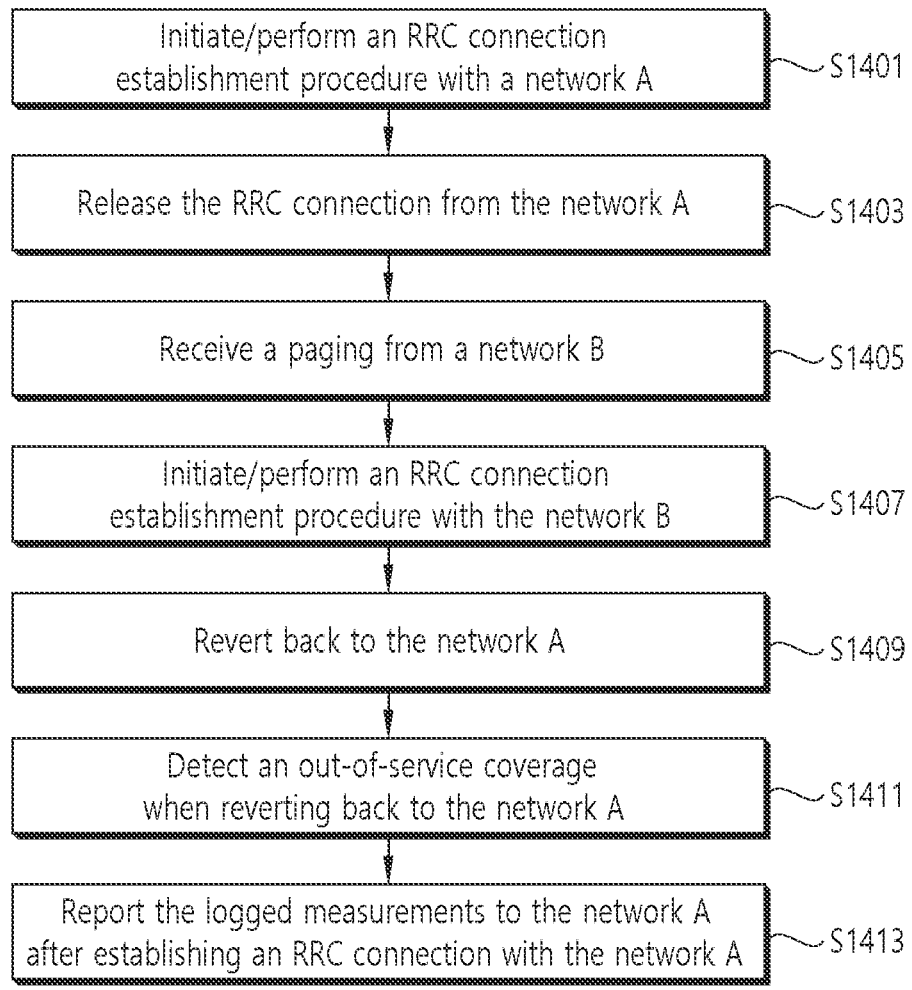
FIG. 14 shows an example of a method for logging out-of-service coverage information during MUSIM operation according to an embodiment of the present disclosure.

FIG. 14 shows an example of a method for logging out-of-service coverage information during MUSIM operation according to an embodiment of the present disclosure. Steps illustrated in FIG. 14 may be performed by a wireless device and/or a UE.

Referring to FIG. 14, in step S1401, the UE may initiate/perform an RRC connection establishment procedure with a network on SIM_A (i.e., network A). The UE may be in a non-connected mode for a network on SIM_B (i.e., network B).

The UE may be capable to support MUSIM operation. The MUSIM operation may comprise at least one of an operation on network A or an operation on network B. The operation on network A may comprise a connected mode operation/inactive mode operation/idle mode operation performed on the network A based on the SIM_A. The operation on network B may comprise a connected mode operation/inactive mode operation/idle mode operation performed on the network B based on the SIM_B.

The UE may be capable to support logging of measurement information in RRC_IDLE/RRC_INACTIVE. The UE may initiate the RRC connection establishment procedure to the network A.

In step S1403, the UE may release the RRC connection from the network A. Therefore, the UE may be in a non-connected mode for the network A and the network B.

The UE may receive an RRC release message from the network A. The UE may enter RRC_IDLE or RRC_INACTIVE state in the network A. The UE may be configured with the logged measurement configuration with event-based out-of-service coverage information (i.e., logged measurement configuration including a configuration for event-triggered logging with event type set to out-of-service) by the network A. The logged measurement configuration may be provided by a dedicated RRC signalling from the network A after the RRC connection establishment, e.g., via RRC Release message or LoggedMeasurementConfiguration message. The logged measurement configuration may include at least one of logging period, logging interval, logging objectives (e.g. frequencies or cells), and/or out-of-service logging indication (i.e., logging instruction for out-of-service). The out-of-service logging indication may be for event-based logging and may indicate the UE to log measurement information of the logging objectives when the UE enters the out-of-service coverage. That is, the UE may perform logging of measurement information as soon as the out-of-service coverage is detected. The out-of-service coverage may be detected by the UE when at least one of the following conditions is satisfied:

If UE is not able to detect any cells for which S criteria is fulfilled;
If no suitable or acceptable cell can be found;
If UE is in any cell selection state;
If UE is in out-of-service; or
If serving cell quality, i.e. RSRP, RSRQ, or SINR, is lower than a threshold configured by the network.

In step S1405, the UE may receive a paging from the network B. The UE may be in a non-connected mode for the network A and the network B.

While performing MUSIM operation, the UE may monitor paging information from the network B. While monitoring paging information on the network B, the UE may receive a paging message from the network B.

In step S1407, the UE may initiate/perform an RRC connection establishment procedure with the network B. The UE may be in a non-connected mode for the network A.

Upon reception of the paging message from the network B, the UE may switch SIM operation for the paging message from the network A to the network B, i.e. establishing RRC connection with the network B.

Whenever the UE needs to perform logged measurement on the network A according to the logged measurement configuration, the UE may perform logged measurement on the network A while performing MUSIM operation on the network B. To avoid conflict operation between logged measurement on the network A and MUSIM operation on the network B, the UE may report logged measurement information of other SIM (i.e., SIM A) to the network B via RRC signalling. The UE may firstly indicate to the network B that there is any logged measurement information of other SIM. Then, after reception of a request for logged measurement information of other SIM from the network B, the UE may report the logged measurement information of other SIM to the network B via RRC dedicated message. Otherwise, the UE may simply report the logged measurement information of other SIM to the network B via RRC dedicated message without the request from the network B. After reception of the logged measurement information of other SIM, the network B may change data scheduling between the UE and the network B considering the logged measurement information of the network A.

In step S1409, the UE may revert back to the network A for which the UE is currently in a non-connected mode.

After communicating with the network B, the UE may receive an RRC release from the network B. Upon reception of the RRC release message from the network B, the UE may release the RRC connection with the network B. After RRC connection release on the network B, the UE may switch SIM operation from the network B to the network A if the operation on the network A is still higher prioritized than the operation on the network B.

In step S1411, the UE may detect an out-of-service coverage when returning back to the network A. The UE may be in a non-connected mode for the network A and the network B.

After switching SIM operation from the network B to the network A, the UE may detect an out-of-service coverage. Then, the UE may perform the event-based logging for the out-of-coverage. When logging the out-of-service coverage information (i.e., measurement information for the detected out-of-service coverage), the UE may set additional information with the legacy out-of-service information, e.g., relativeTimeStamp, locationInfo, anyCellSelectionDetected to indicate the detection of no suitable or no acceptable cell found, servCellIdentity to indicate global cell identity of the last logged cell that the UE was camping on, measResult- ServCell to include the quantities of the last logged cell the UE was camping on. The additional information may indicate that the out-of-service coverage has been detected as soon as switching back to the network A and the UE may be in out-of-service coverage in the network A while performing MUSIM operation on the network B (i.e., before switching back to the network A). The additional information can be a single indication.

In step S1413, the UE may report the logged measurement information to the network A after establishing an RRC connection with the network A. The UE may be in a connected mode for the network A, and non-connected mode for the network B.

After establishing an RRC connection with the network A, the UE may construct the logged measurement report including the stored logged measurement entries for the out-of-service coverage. The UE may indicate to the network that the logged measurement report is available. The indication may be included in RRCSetupComplete message. The UE may transmit the logged measurement report to the network. The transmission of the logged measurement report may be performed upon request (e.g., UEInformationRequest) by the network, e.g., via the UEInformationResponse message.

Figure 15:
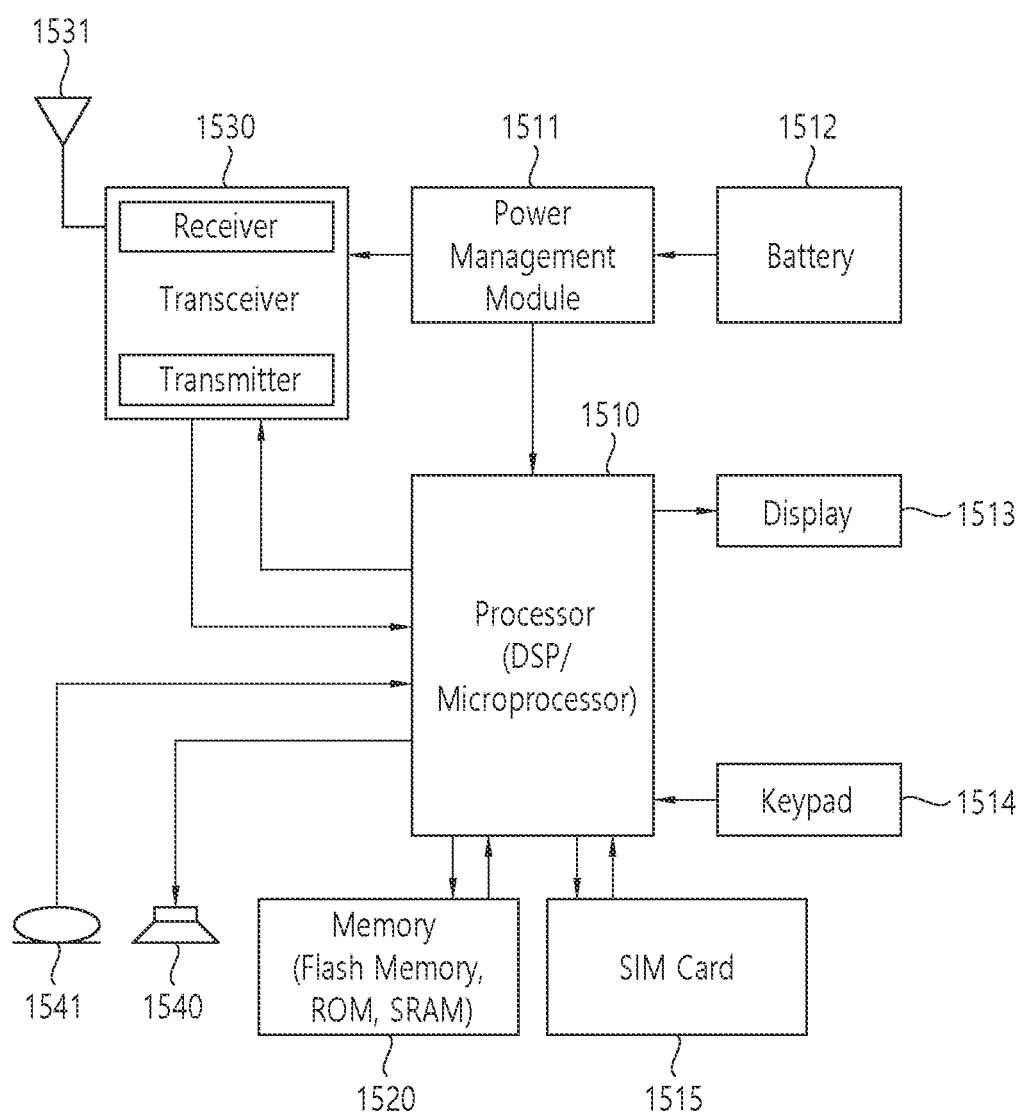
FIG. 15 shows a UE to implement an embodiment of the present disclosure.

FIG. 15 shows a UE to implement an embodiment of the present disclosure. The present disclosure described above for UE side may be applied to this embodiment. The UE in FIG. 15 may be an example of first device 210 as illustrated in FIG. 2.

A UE includes a processor 1510 (i.e., processor 211), a power management module 1511, a battery 1512, a display 1513, a keypad 1514, a subscriber identification module (SIM) card 1515, a memory 1520 (i.e., memory 212), a transceiver 1530 (i.e., transceiver 213), one or more antennas 1531, a speaker 1540, and a microphone 1541.

The processor 1510 may be configured to implement proposed functions, procedures and/or methods described in this description. Layers of the radio interface protocol may be implemented in the processor 1510. The processor 1510 may include application-specific integrated circuit (ASIC), other chipset, logic circuit and/or data processing device. The processor 1510 may be an application processor (AP). The processor 1510 may include at least one of a digital signal processor (DSP), a central processing unit (CPU), a graphics processing unit (GPU), a modem (modulator and demodulator). An example of the processor 1510 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 1510 may be configured to, or configured to control the transceiver 1530 to implement steps performed by the UE and/or the wireless device throughout the disclosure.

The power management module 1511 manages power for the processor 1510 and/or the transceiver 1530. The battery 1512 supplies power to the power management module 1511. The display 1513 outputs results processed by the processor 1510. The keypad 1514 receives inputs to be used by the processor 1510. The keypad 1514 may be shown on the display 1513. The SIM card 1515 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 1520 is operatively coupled with the processor 1510 and stores a variety of information to operate the processor 1510. The memory 1520 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 1520 and executed by the processor 1510. The memory 1520 can be implemented within the processor 1510 or external to the processor 1510 in which case those can be communicatively coupled to the processor 1510 via various means as is known in the art.

The transceiver 1530 is operatively coupled with the processor 1510, and transmits and/or receives a radio signal. The transceiver 1530 includes a transmitter and a receiver. The transceiver 1530 may include baseband circuitry to process radio frequency signals. The transceiver 1530 controls the one or more antennas 1531 to transmit and/or receive a radio signal.

The speaker 1540 outputs sound-related results processed by the processor 1510. The microphone 1541 receives sound-related inputs to be used by the processor 1510.

According to various embodiments, the processor 1510 may be configured to, or configured to control the transceiver 1530 to implement steps performed by the UE and/or the wireless device throughout the disclosure. For example, the processor 1510 may be configured to register to a first network and a second network. The processor 1510 may be configured to control the transceiver 1530 to receive a logging instruction for out-of-service. The processor 1510 may be configured to detect an out-of-service coverage upon switching to the first network from the second network. The processor 1510 may be configured to generate logging information for the detected out-of-service coverage based on the logging instruction for out-of-service. The logging information may comprise information informing that the out-of-service coverage is detected upon switching to the first network from the second network. The processor 1510 may be configured to control the transceiver 1530 to transmit the logging information.

Figure 16:
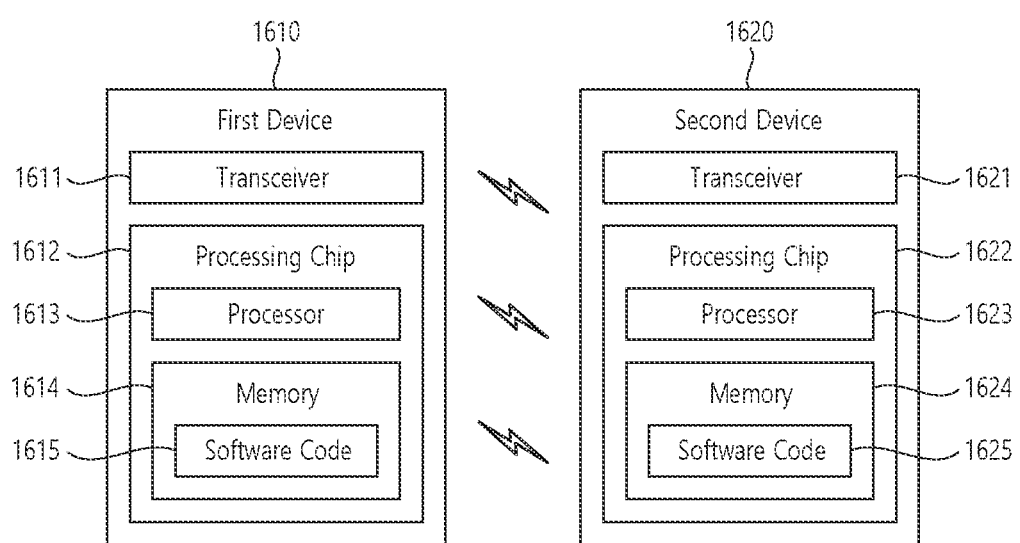
FIG. 16 shows another example of a wireless communication system to which the technical features of the present disclosure can be applied.

FIG. 16 shows another example of a wireless communication system to which the technical features of the present disclosure can be applied.

Referring to FIG. 16, the wireless communication system may include a first device 1610 (i.e., first device 210) and a second device 1620 (i.e., second device 220).

The first device 1610 may include at least one transceiver, such as a transceiver 1611, and at least one processing chip, such as a processing chip 1612. The processing chip 1612 may include at least one processor, such a processor 1613, and at least one memory, such as a memory 1614. The memory may be operably connectable to the processor 1613. The memory 1614 may store various types of information and/or instructions. The memory 1614 may store a software code 1615 which implements instructions that, when executed by the processor 1613, perform operations of the first device 910 described throughout the disclosure. For example, the software code 1615 may implement instructions that, when executed by the processor 1613, perform the functions, procedures, and/or methods of the first device 1610 described throughout the disclosure. For example, the software code 1615 may control the processor 1613 to perform one or more protocols. For example, the software code 1615 may control the processor 1613 to perform one or more layers of the radio interface protocol.

The second device 1620 may include at least one transceiver, such as a transceiver 1621, and at least one processing chip, such as a processing chip 1622. The processing chip 1622 may include at least one processor, such a processor 1623, and at least one memory, such as a memory 1624. The memory may be operably connectable to the processor 1623. The memory 1624 may store various types of information and/or instructions. The memory 1624 may store a software code 1625 which implements instructions that, when executed by the processor 1623, perform operations of the second device 1620 described throughout the disclosure. For example, the software code 1625 may implement instructions that, when executed by the processor 1623, perform the functions, procedures, and/or methods of the second device 1620 described throughout the disclosure. For example, the software code 1625 may control the processor 1623 to perform one or more protocols. For example, the software code 1625 may control the processor 1623 to perform one or more layers of the radio interface protocol.

According to various embodiments, the first device 1610 as illustrated in FIG. 16 may comprise a wireless device. The wireless device may comprise a transceiver 1611, a processing chip 1612. The processing chip 1612 may comprise a processor 1613, and a memory 1614. The memory 1614 may be operably connectable to the processor 1613. The memory 1614 may store various types of information and/or instructions. The memory 1614 may store a software code 1615 which implements instructions that, when executed by the processor 1613, perform operations comprising: registering to a first network and a second network; receiving a logging instruction for out-of-service; detecting an out-of-service coverage upon switching to the first network from the second network; generating logging information for the detected out-of-service coverage based on the logging instruction for out-of-service, wherein the logging information comprises information informing that the out-of-service coverage is detected upon switching to the first network from the second network; and transmitting the logging information.

According to various embodiments, a non-transitory computer-readable medium may have stored thereon a plurality of instructions. The plurality of instructions, when executed by a processor of a wireless device, may cause the wireless device to: register to a first network and a second network; receive a logging instruction for out-of-service; detect an out-of-service coverage upon switching to the first network from the second network; generate logging information for the detected out-of-service coverage based on the logging instruction for out-of-service, wherein the logging information comprises information informing that the out-of-service coverage is detected upon switching to the first network from the second network; and transmit the logging information.

The present disclosure may be applied to various future technologies, such as AI, robots, autonomous-driving/self-driving vehicles, and/or extended reality (XR).

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 17:
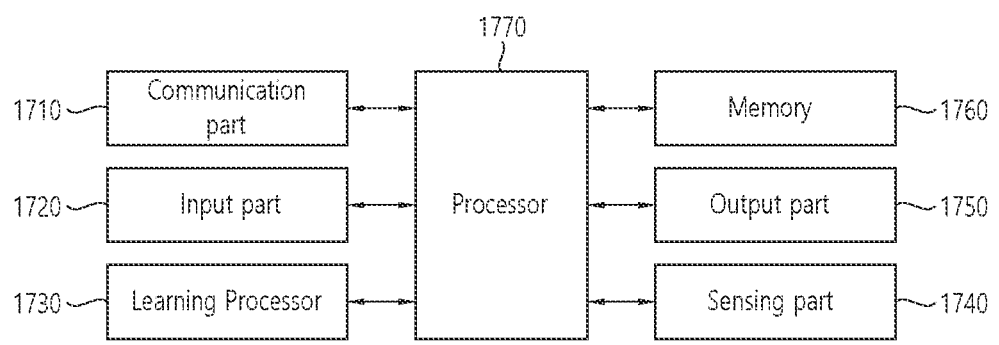
FIG. 17 shows an example of an AI device to which the technical features of the present disclosure can be applied.

FIG. 17 shows an example of an AI device to which the technical features of the present disclosure can be applied.

The AI device 1700 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 17, the AI device 1700 may include a communication part 1710, an input part 1780, a learning processor 1730, a sensing part 1740, an output part 1750, a memory 1760, and a processor 1770.

The communication part 1710 can transmit and/or receive data to and/or from external devices such as the AI devices and the AI server using wire and/or wireless communication technology. For example, the communication part 1710 can transmit and/or receive sensor information, a user input, a learning model, and a control signal with external devices. The communication technology used by the communication part 1710 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 1780 can acquire various kinds of data. The input part 1780 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 1780 can acquire input data to be used when acquiring an output using learning data and a learning model for model learning. The input part 1780 may obtain raw input data, in which case the processor 1770 or the learning processor 1730 may extract input features by preprocessing the input data.

The learning processor 1730 may learn a model composed of an ANN using learning data. The learned ANN can be referred to as a learning model. The learning model can be used to infer result values for new input data rather than learning data, and the inferred values can be used as a basis for determining which actions to perform. The learning processor 1730 may perform AI processing together with the learning processor of the AI server. The learning processor 1730 may include a memory integrated and/or implemented in the AI device 1700. Alternatively, the learning processor 1730 may be implemented using the memory 1760, an external memory directly coupled to the AI device 1700, and/or a memory maintained in an external device.

The sensing part 1740 may acquire at least one of internal information of the AI device 1700, environment information of the AI device 1700, and/or the user information using various sensors. The sensors included in the sensing part 1740 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 1750 may generate an output related to visual, auditory, tactile, etc. The output part 1750 may include a display unit for outputting visual information, a speaker for outputting auditory information, and/or a haptic module for outputting tactile information.

The memory 1760 may store data that supports various functions of the AI device 1700. For example, the memory 1760 may store input data acquired by the input part 1780, learning data, a learning model, a learning history, etc.

The processor 1770 may determine at least one executable operation of the AI device 1700 based on information determined and/or generated using a data analysis algorithm and/or a machine learning algorithm. The processor 1770 may then control the components of the AI device 1700 to perform the determined operation. The processor 1770 may request, retrieve, receive, and/or utilize data in the learning processor 1730 and/or the memory 1760, and may control the components of the AI device 1700 to execute the predicted operation and/or the operation determined to be desirable among the at least one executable operation. The processor 1770 may generate a control signal for controlling the external device, and may transmit the generated control signal to the external device, when the external device needs to be linked to perform the determined operation. The processor 1770 may obtain the intention information for the user input and determine the user's requirements based on the obtained intention information. The processor 1770 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 1730 and/or learned by the learning processor of the AI server, and/or learned by their distributed processing. The processor 1770 may collect history information including the operation contents of the AI device 1700 and/or the user's feedback on the operation, etc. The processor 1770 may store the collected history information in the memory 1760 and/or the learning processor 1730, and/or transmit to an external device such as the AI server. The collected history information can be used to update the learning model. The processor 1770 may control at least some of the components of AI device 1700 to drive an application program stored in memory 1760. Furthermore, the processor 1770 may operate two or more of the components included in the AI device 1700 in combination with each other for driving the application program.

Figure 18:
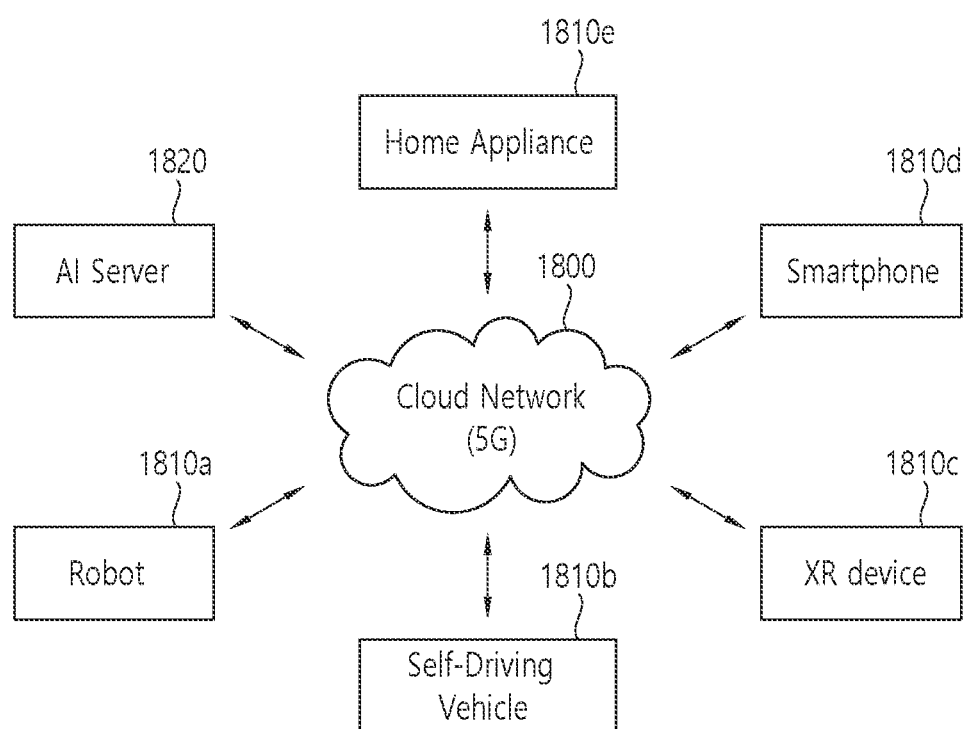
FIG. 18 shows an example of an AI system to which the technical features of the present disclosure can be applied.

FIG. 18 shows an example of an AI system to which the technical features of the present disclosure can be applied.

Referring to FIG. 18, in the AI system, at least one of an AI server 1820, a robot 1810a, an autonomous vehicle 1810b, an XR device 1810c, a smartphone 1810d and/or a home appliance 1810e is connected to a cloud network 1800. The robot 1810a, the autonomous vehicle 1810b, the XR device 1810c, the smartphone 1810d, and/or the home appliance 1810e to which the AI technology is applied may be referred to as AI devices 1810a to 1810e.

The cloud network 1800 may refer to a network that forms part of a cloud computing infrastructure and/or resides in a cloud computing infrastructure. The cloud network 1800 may be configured using a 3G network, a 4G or LTE network, and/or a 5G network. That is, each of the devices 1810a to 1810e and 1820 consisting the AI system may be connected to each other through the cloud network 1800. In particular, each of the devices 1810a to 1810e and 1820 may communicate with each other through a base station, but may directly communicate with each other without using a base station.

The AI server 1820 may include a server for performing AI processing and a server for performing operations on big data. The AI server 1820 is connected to at least one or more of AI devices constituting the AI system, i.e. the robot 1810a, the autonomous vehicle 1810b, the XR device 1810c, the smartphone 1810d and/or the home appliance 1810e through the cloud network 1800, and may assist at least some AI processing of the connected AI devices 1810a to 1810e. The AI server 1820 can learn the ANN according to the machine learning algorithm on behalf of the AI devices 1810a to 1810e, and can directly store the learning models and/or transmit them to the AI devices 1810a to 1810e. The AI server 1820 may receive the input data from the AI devices 1810a to 1810e, infer the result value with respect to the received input data using the learning model, generate a response and/or a control command based on the inferred result value, and transmit the generated data to the AI devices 1810a to 1810e. Alternatively, the AI devices 1810a to 1810e may directly infer a result value for the input data using a learning model, and generate a response and/or a control command based on the inferred result value.

Various embodiments of the AI devices 1810a to 1810e to which the technical features of the present disclosure can be applied will be described. The AI devices 1810a to 1810e shown in FIG. 18 can be seen as specific embodiments of the AI device 1700 shown in FIG. 17.

The present disclosure can have various advantageous effects.

For example, when the network provides a configuration to perform a logged measurement to the UE which is capable to support MUSIM operation, in addition to the logged measurement result, the UE can provide an indication that the out-of-service coverage has been entered before switching MUSIM operation in a logged measurement report so that the network can assume that the actual size/area of the out-of-service coverage is bigger than the reported size/area. Therefore, the network can prevent misinterpretation of the size/area of the out-of-service coverage by the indication in the logged measurement report.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device in a wireless communication system, the method comprising:
registering to a first network and a second network;
receiving a logging instruction for out-of-service;
detecting an out-of-service coverage upon switching to the first network from the second network;
generating logging information for the detected out-of-service coverage based on the logging instruction for out-of-service, wherein the logging information comprises information informing that the out-of-service coverage is detected upon switching to the first network from the second network; and
transmitting the logging information.

2. The method of claim 1, wherein the wireless device is equipped with multiple universal subscriber identity modules (MUSIM) including a first USIM related to the first network and a second USIM related to the second network, and
wherein the registering to the first network and the second network comprises:
registering to the first network based on the first USIM; and
registering to the second network based on the second USIM.

3. The method of claim 1, further comprising:
performing an operation on the first network;
receiving a paging from the second network while performing the operation on the first network;
upon receiving the paging from the second network, establishing a connection with the second network; and
performing an operation on the second network based on the connection with the second network.

4. The method of claim 3, further comprising:
performing a logging of measurement information on the first network while performing the operation on the second network; and
transmitting, to the second network, the logged measurement information on the first network.

5. The method of claim 3, wherein the switching to the first network from the second network comprises:
releasing the connection with the second network after the operation on the second network is completed; and
performing an operation on the first network after releasing the connection with the second network.

6. The method of claim 1, wherein the logging instruction for out-of-service instructs the wireless device to generate the logging information when detecting the out-of-service coverage.

7. The method of claim 1, wherein the detecting of the out-of-service coverage comprises detecting at least one of:
a first condition that the wireless device is not able to detect any cells for which cell selection criteria is fulfilled;
a second condition that no suitable cell or no acceptable cell is found;
a third condition that the wireless device is in any cell selection state; or
a fourth condition that a serving cell quality is lower than a threshold configured by a network.

8. The method of claim 1, further comprising:
receiving a configuration for event-triggered logging comprising a logging interval and the logging instruction for out-of-service,
wherein the generating of the logging information for the detected out-of-service coverage comprises:
generating, based on the logging instruction for out-of-service, the logging information at regular time intervals determined by the logging interval when detecting the out-of-service coverage.

9. The method of claim 1, wherein the generating of the logging information for the detected out-of-service coverage comprises logging measurement information when detecting the out-of-service coverage, based on the logging instruction for out-of-service, and
wherein the logged measurement information corresponds to the logging information.

10. The method of claim 1, wherein the logging information comprises at least one of a cell identifier, a signal quality of a cell, a measurement time or a measurement location.

11. The method of claim 1, wherein the information informing that the out-of-service coverage is detected upon switching to the first network from the second network comprises information informing that the wireless device has entered the out-of-service coverage while performing a communication with the second network.

12. The method of claim 1, wherein the logging information for the detected out-of-service coverage is used to identify an area or size of the out-of-service coverage.

13. The method of claim 1, wherein the transmitting of the logging information comprises transmitting the logging information to at least one of the first network or the second network.

14. The method of claim 1, wherein the wireless device is in communication with at least one of a user equipment, a network, and/or autonomous vehicles other than the wireless device.

15. A wireless device in a wireless communication system comprising:
 a transceiver;
 a memory; and
 at least one processor operatively coupled to the transceiver and the memory, and configured to:
 register to a first network and a second network;
 control the transceiver to receive a logging instruction for out-of-service;
 detect an out-of-service coverage upon switching to the first network from the second network;
 generate logging information for the detected out-of-service coverage based on the logging instruction for out-of-service, wherein the logging information comprises information informing that the out-of-service coverage is detected upon switching to the first network from the second network; and
 control the transceiver to transmit the logging information.

16. A non-transitory computer-readable medium having stored thereon a plurality of instructions, wherein the plurality of instructions, when executed by a processor of a wireless device, cause the wireless device to:
 register to a first network and a second network;
 receive a logging instruction for out-of-service;
 detect an out-of-service coverage upon switching to the first network from the second network;
 generate logging information for the detected out-of-service coverage based on the logging instruction for out-of-service, wherein the logging information comprises information informing that the out-of-service coverage is detected upon switching to the first network from the second network; and
 transmit the logging information.

* * * * *